(12) United States Patent
Tanaka et al.

(10) Patent No.: US 8,925,513 B2
(45) Date of Patent: Jan. 6, 2015

(54) INTERNAL COMBUSTION ENGINE OIL SUPPLY SYSTEM CONTAINED IN A BODY OF THE ENGINE

(75) Inventors: Masataka Tanaka, Saitama (JP); Tsuyoshi Arima, Saitama (JP); Hidetoshi Wakasa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 409 days.

(21) Appl. No.: 13/433,605

(22) Filed: Mar. 29, 2012

(65) Prior Publication Data

US 2012/0247418 A1 Oct. 4, 2012

(30) Foreign Application Priority Data

Mar. 31, 2011 (JP) ................. 2011-080681

(51) Int. Cl.
*F01M 1/02* (2006.01)
(52) U.S. Cl.
USPC ....................................... 123/196 R; 184/6.5

(58) Field of Classification Search
USPC ................... 123/196 R, 198 C; 184/6.28, 6.5
See application file for complete search history.

(56) References Cited

FOREIGN PATENT DOCUMENTS

JP 4467412 B2 5/2010

*Primary Examiner* — Noah Kamen
(74) *Attorney, Agent, or Firm* — Carrier Blackman & Associates, P.C.; Joseph P. Carrier; William D. Blackman

(57) ABSTRACT

An internal combustion engine oil supply system contained in a body of the engine, in which a pump casing common to first and second oil pumps having a common pump shaft rotated interlockingly with rotation of a crankshaft of the engine is provided with a main suction port common to the first and second oil pumps, and first and second relief valves are individually connected to discharge passages of the first and second oil pumps. The main suction port is partitioned into first and second suction ports. The pump casing is formed with a first suction passage extending from the first suction port to a suction side of the first oil pump, and a second suction passage extending from the second suction port to a suction side of the second oil pump. Release ports of the first and second relief valves are connected to the second suction passage.

16 Claims, 19 Drawing Sheets

INTERNAL COMBUSTION ENGINE OIL SUPPLY SYSTEM CONTAINED IN A BODY OF THE ENGINE

CROSS-REFERENCE TO RELATED APPLICATIONS

The present invention claims priority under 35 USC 119 based on Japanese patent application No. 2011-080681, filed on Mar. 31, 2011. The entire subject matter of this priority document, including the specification, claims and drawings thereof, is incorporated by reference herein.

TECHNICAL FIELD

The present invention relates to an internal combustion engine oil supply system wherein a pump casing common to first and second oil pumps having a common pump shaft rotated interlockingly with rotation of a crankshaft is provided with a suction port common to the first and second oil pumps, and first and second relief valves are individually connected to discharge passages of the first and second oil pumps.

BACKGROUND ART

An internal combustion engine oil supply system wherein a common single suction port possessed by a pair of oil pumps sharing a pump casing is connected to an oil strainer and wherein relief valves are individually connected to discharge passages of the oil pumps has been known, as disclosed in Patent Document 1.
Patent Document 1—Japanese Patent No. 4467412

In the system disclosed in the Patent Document 1, the oil discharged from the relief valve of each of the oil pumps is returned to the suction side of the corresponding oil pump. In the case where the oil discharged from one of the pair of oil pumps is used as a lubricating oil supplied to to-be-lubricated portions of engine body parts whereas the oil discharged from the other oil pump is used for control of oil pressure in a transmission, however, a circulating circuit may be so configured that the oil discharged from the other oil pump is entirely returned to the suction side of the other oil pump through the relief valve at other times than the time of a gear shift. In this case, since the suction port is common to both the oil pumps, a portion of the oil to be sucked by the one oil pump may be sucked into the circulating circuit side. In such a situation, if a rapid acceleration or rapid deceleration of the vehicle is conducted, the oil surface of the oil in the engine body may be oscillated back and forth so that a suction port of an oil strainer may be exposed from the oil surface, resulting in that air is sucked into the oil strainer together with the oil. If the oil thus admixed with air is sucked into the circulating circuit in a large quantity, it may influence the control of oil pressure in the transmission. In order to prevent such a situation from occurring, therefore, it is necessary to take a countermeasure, such as enhancing the pump capacity of the one oil pump, which may lead to an increase in pump size.

SUMMARY OF THE INVENTION

The present invention has been made in consideration of the above-mentioned circumstances. Accordingly, it is an object of the present invention to provide an internal combustion engine oil supply system wherein it is ensured that even in a state where an oil circulating circuit is composed using one of a pair of oil pumps sharing a suction port, a situation in which air-admixed oil is sucked into the one oil pump is less liable to occur, so that a detrimental influence of the air is unlikely to be produced.

In order to attain the above object, the invention is firstly characterized, in an internal combustion engine oil supply system contained in a body of the engine, in which a pump casing common to first and second oil pumps having a common pump shaft rotated interlockingly with rotation of a crankshaft of the engine is provided with a main suction port common to the first and second oil pumps, and first and second relief valves are individually connected to discharge passages of the first and second oil pumps, wherein the main suction port is partitioned by a partition wall provided in the pump casing into first and second suction ports, the pump casing is formed with a first suction passage which extends from the first suction port to a suction side of the first oil pump and a second suction passage which is formed independently of the first suction passage so as to extend from the second suction port to a suction side of the second oil pump, and release ports of the first and second relief valves are connected to the second suction passage.

The present invention is secondly characterized, in addition to the configuration according to the first characteristic, in that a single oil strainer common to the first and second oil pumps is disposed at a portion in an engine body lower than the first and second oil pumps, and the first and second suction ports are commonly connected to the oil strainer.

The present invention is thirdly characterized, in addition to the configuration according to the first or second characteristic, in that the first oil pump is connected to supply a lubricating oil to a plurality of to-be-lubricated parts of an engine body, and the second oil pump is connected to supply an oil pressure control oil to an oil pressure controller of a transmission.

The present invention is fourthly characterized, in addition to the configuration according to any of the first to third characteristics, in that the pump casing includes first and second case members, and a plate is interposed between the first and second case members so as to form a pump chamber of the first oil pump between the first case member and the plate and to form a pump chamber of the second oil pump between the second case member and the plate; and the first and second suction passages are isolated from each other by the plate and a partition wall provided integrally with one of the first and second case members.

The present invention is fifthly characterized, in addition to the configuration according to the fourth characteristic, in that the first relief valve is attached to the first case member adjacent to the plate, and the plate is provided with a communication hole through which the release port of the first relief valve communicates with the second suction passage.

The present invention is sixthly characterized, in addition to the configuration according to the fourth characteristic, in that the partition wall is disposed to partition the main suction port into upper and lower portions which form the first and second suction ports, when the engine body is mounted on a vehicle.

The present invention is seventhly characterized, in addition to the configuration according to the second characteristic, in that the pump shaft is connected coaxially and relatively non-rotatably to a balancer shaft, and the main suction port is opened toward an inner side of the engine body in a direction along an axis of the balancer shaft such that a joint portion between itself and the oil strainer is located between the pump casing and a balance weight provided on the balancer shaft.

The present invention is eighthly characterized, in addition to the configuration according to any of the first to seventh characteristics, in that a width of the partition wall gradually increases along the direction from the plate toward the main suction port.

Incidentally, the pump body 118 in an exemplary embodiment described below corresponds to the first case member in the present invention, and the pump cover 119 in the embodiment corresponds to the second case member in the present invention.

EFFECT OF THE INVENTION

According to the first characteristic of the present invention, the main suction port common to the first and second oil pumps is partitioned by the partition wall into the first suction port of the first suction passage communicating with the first oil pump and the second suction port of the second suction passage communicating with the second oil pump side and independent of the first suction passage, and the release ports of the first and second relief valves are connected to the second suction passage on the second oil pump side. Therefore, even in the case where the oil released from the relief valve of the first oil pump is also sucked into the second oil pump and the oil circulating circuit is configured on the second oil pump side, an overflow of oil from the circulating circuit to the side of the suction passage of the first oil pump is caused, whereby the quantity of the oil drawn to the second oil pump side is reduced. In the case where the oil contains a large quantity of air mixed therein, influence of the air can be prevented from being produced on the second oil pump side. Besides, an increase in the size of the first oil pump can be obviated.

According to the second characteristic of the present invention, the first and second suction ports are commonly connected to the single oil strainer which is common to the first and second oil pumps. Therefore, the number of component parts can be reduced owing to the structure where the single oil strainer is used.

According to the third characteristic of the present invention, the lubricating oil is supplied to the to-be-lubricated parts of the engine body by the first oil pump, whereas the oil pressure control oil is supplied to the oil pressure controller of the transmission by the second oil pump. This ensures that, in the condition where the oil circulating circuit is configured on the second oil pump side when the transmission controller is not operated, the quantity of oil supplied to the to-be-lubricated parts of the engine body can be prevented from becoming insufficient. In this instance, even in the case where the oil with air mixed therein is sucked in from the oil strainer, by sucking substantially the whole amount of the oil sucked in from the oil strainer into the first oil pump, the air-mixed oil can be easily led to the side of the to-be-lubricated parts of the engine body where the supply of the air-mixed oil would not produce any problem.

According to the fourth characteristic of the present invention, the pump casing is composed of the first and second case members and the plate which is clamped between the first and second case members so as to define the pump chambers of the first and second oil pumps between the first and second case members. In addition, the first and second suction passages are isolated from each other by the plate and the partition wall which is formed integrally with one of the first and second case members. Therefore, the structure in which the first and second suction passages are formed inside the pump casing so as to be isolated from each other can be configured simply.

According to the fifth characteristic of the present invention, the plate adjacent to the first relief valve is provided with the communication hole through which the release port of the first relief valve communicates with the second suction passage. This ensures that the oil discharged from the first relief valve can be led into the second suction passage with a simple structure.

According to the sixth characteristic of the present invention, the partition wall is so disposed as to partition the main suction port into upper and lower portions in the condition where the engine body is mounted on the vehicle. Therefore, even when the oil inside the main suction port is distributed unevenly in the back-and-forth direction due to an acceleration or deceleration of the vehicle, the quantities of oil flowing in the first and second suction passages can be prevented from being changed.

According to the seventh characteristic of the present invention, the main suction port is connected to the oil strainer between the pump casing and the balance weight provided on the balancer shaft that is connected in a coaxial and relatively non-rotatable manner to the pump shaft. This ensures that the main suction port can be connected to the oil strainer by effectively utilizing the space between the pump casing and the balance weight.

According to the eighth characteristic of the present invention, the width of the partition wall gradually increases along the direction toward the suction port side. This makes it possible to enhance the rigidity of the partition wall at its tip portion on which the sucked-in oil impinges.

DETAILED DESCRIPTION OF MODE FOR CARRYING OUT THE INVENTION

Figure 1:
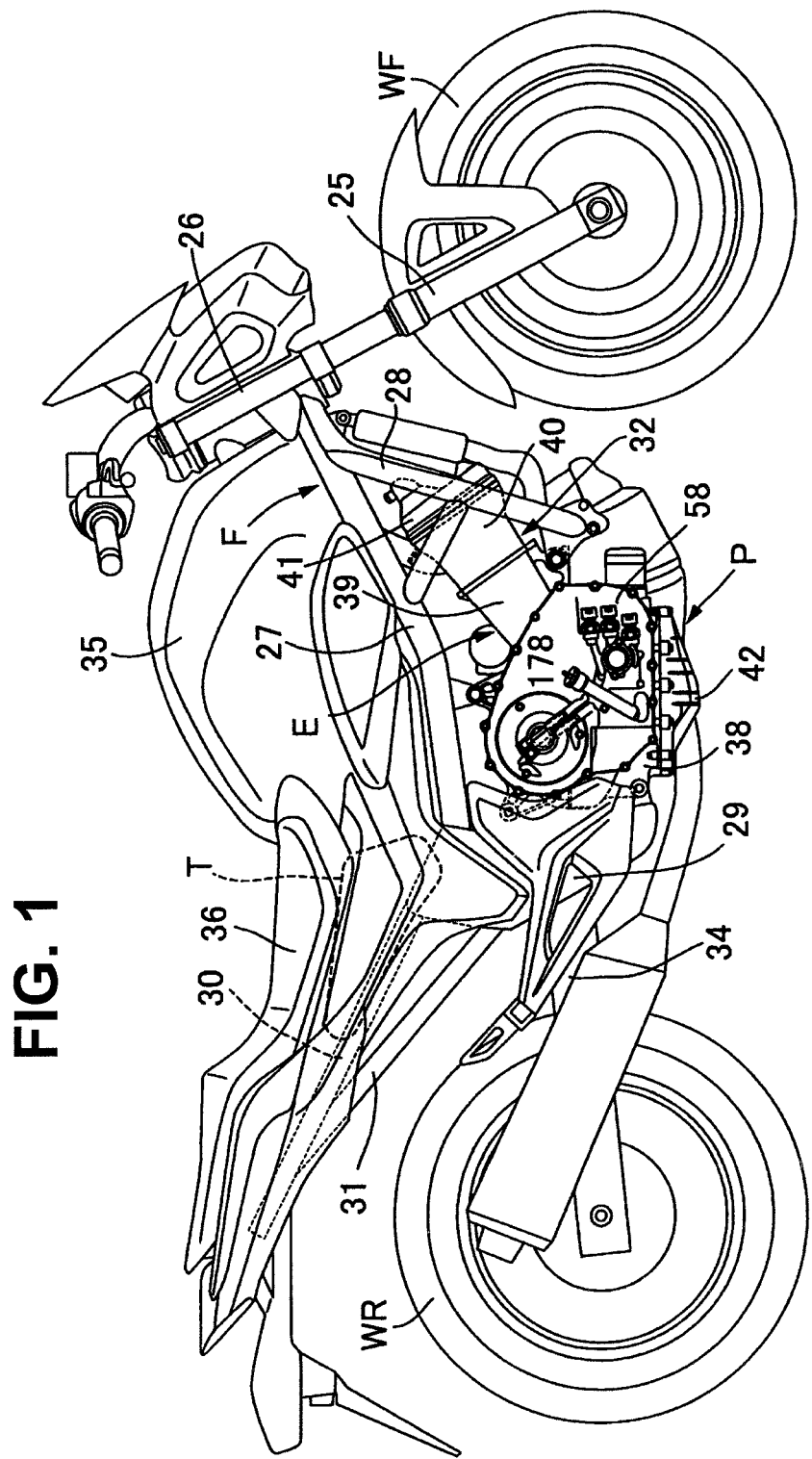
FIG. 1 is a side view of a motorcycle having an internal combustion engine with an oil supply system according to an exemplary embodiment of the present invention.

An exemplary embodiment of the present invention will now be described referring to the accompanying FIGS. 1 to 20. First, in FIG. 1, a body frame F of a motorcycle as a saddle type vehicle includes: a head pipe 26 steerably supporting a front fork 25 on which a front wheel WF is rotatably borne; a pair of left and right main frames 27 . . . extending rearwardly downward from the head pipe 26; a pair of left and right down frames 28 . . . extending rearwardly downward from the main frames 27 . . . more steeply than the latter; a pair of left and right center frames 29 . . . extending downward from rear ends of the main frames 27 . . . ; a pair of left and right seat rails 30 . . . extending rearwardly upward from upper portions of the center frames 29 . . . ; and rear frames 31 . . . by which intermediate portions of the center frames 29 . . . are connected to rear portions of the seat rails 30 . . . .

In a region surrounded by the main frames 27 . . . , the down frames 28 . . . and the center frames 29 . . . , a power unit P including a multi-cylinder (e.g., two-cylinder) internal combustion engine E and a transmission M (see FIG. 3) partly incorporated in an engine body 32 of the internal combustion engine E is disposed in the state of being supported by the body frame F. In addition, a swing arm 34 rotatably supporting on a rear end portion thereof a rear wheel WR driven by power outputted from the power unit P is borne at a front end portion thereof on the center frames 29 . . . so as to be swingable upward and downward. Besides, a storage box 35 is mounted on the main frames 27 . . . on the upper side of the internal combustion engine E, a tandem-type rider seat 36 is disposed rearwardly of the storage box 35 in the state of being supported by the seat rails 30 . . . , and a fuel tank T is disposed under the rider seat 36.

Figure 2:
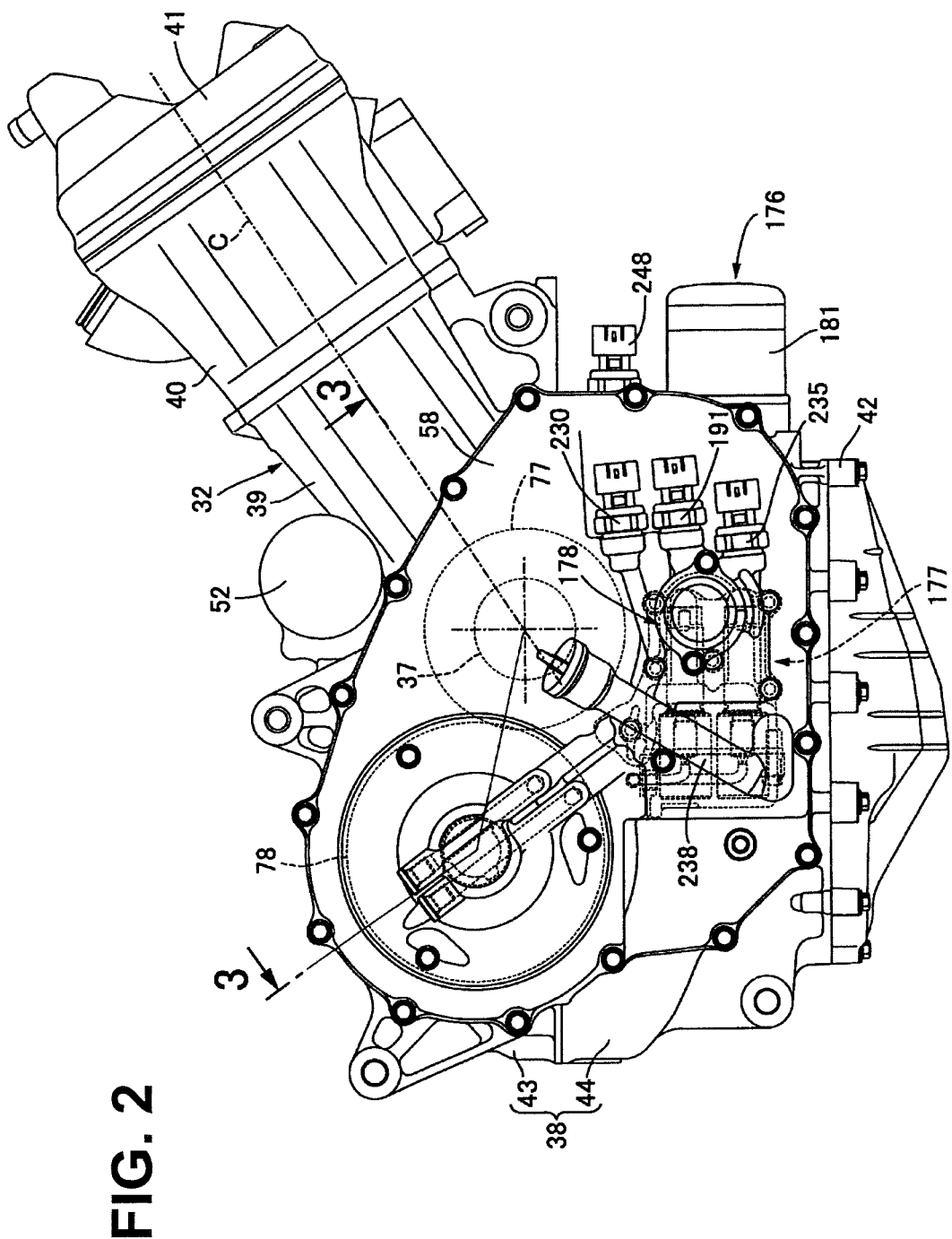
FIG. 2 is a side view, as viewed in the same direction as FIG. 1, of an engine body of the motorcycle's engine.

In FIG. 2, the engine body 32 of the internal combustion engine E includes: a crankcase 38 on which a crankshaft 37 having an axis extending in the vehicle width direction is rotatably borne; a cylinder block 39 connected to a front portion upper end of the crankcase 38, with a cylinder axis C inclined to the front side; a cylinder head 40 connected to the upper end of the cylinder block 39; a head cover 41 connected to the upper end of the cylinder head 40; and an oil pan 42 connected to a lower portion of the crankcase 38.

Figure 3:
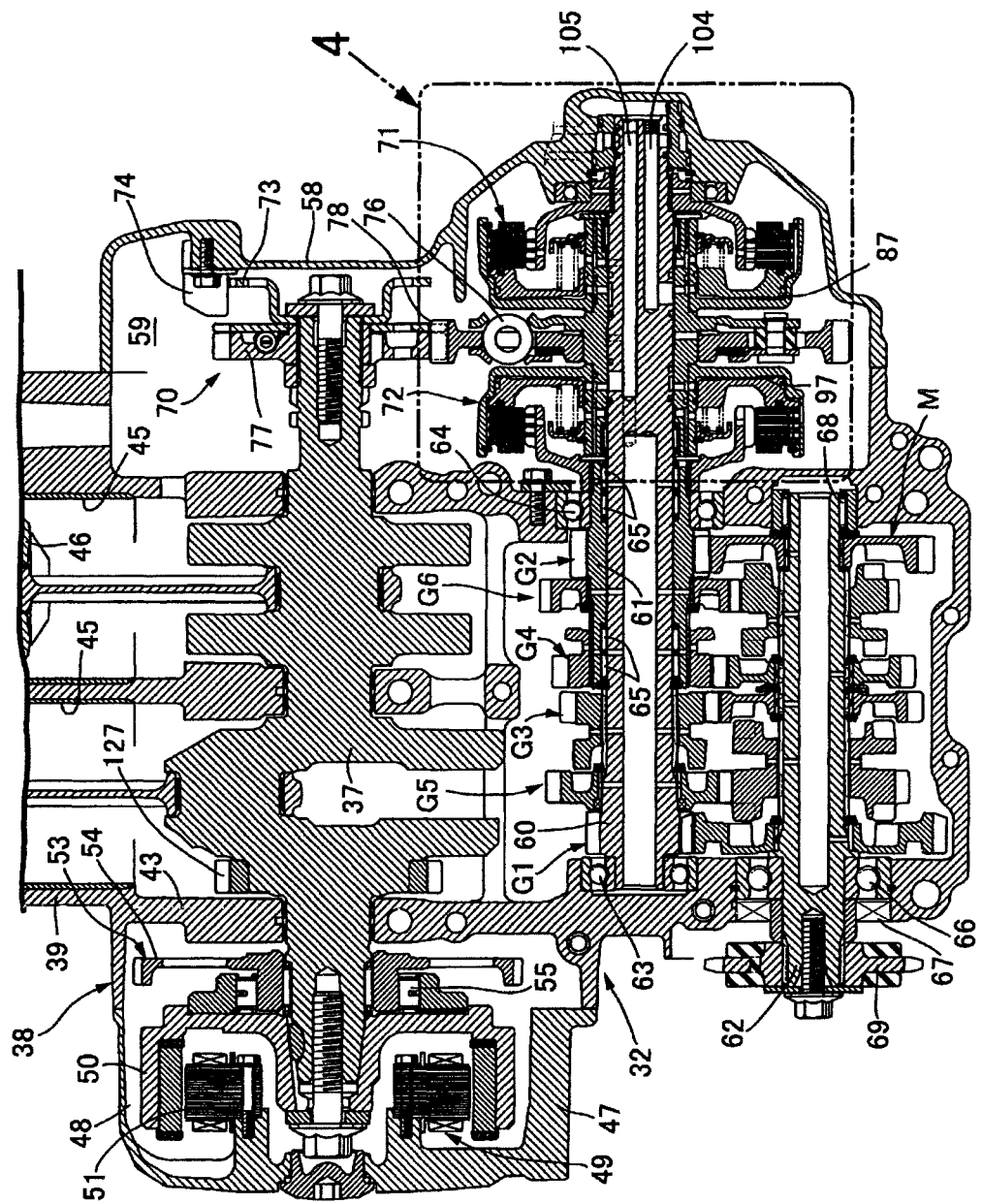
FIG. 3 is a sectional view taken along line 3-3 of FIG. 2.

Referring to FIG. 3 also, the crankcase 38 is composed by mutual coupling of an upper case half 43 and a lower case half 44 which can be split to the upper and lower sides at their mating surfaces along a horizontal plane passing the axis of the crankshaft 37. The cylinder block 39 is formed integrally with the upper case half 43.

The cylinder block 39 has a plurality of, for example two cylinder bores 45, 45 arranged juxaposedly in the vehicle width direction, and pistons 46 . . . are slidably fitted respectively in the cylinder bores 45 . . . . The pistons 46 . . . are connected to the crankshaft 37, which extends in the array direction of the cylinder bores 45 . . . , namely, in the vehicle width direction, and is rotatably borne on the crankcase 38.

To a left side surface of the crankcase 38, a generator cover 47 constituting a part of the engine body 32 is connected, the generator cover 47 defining a generator chamber 48 between itself and the crankcase 38. A rotor 50 of a generator 49 contained in the generator chamber 48 is fixed to that end portion of the crankshaft 37 which projects into the generator chamber 48. A stator 51 of the generator 49 is fixed to the generator cover 47 while being surrounded by the rotor 50.

In addition, as shown in FIG. 2, a starter motor 52 is fixedly disposed at an upper portion of the crankcase 38. A driven gear 54 constituting a part of a speed reduction gear train 53 for transmitting power from the starter motor 52 is connected to the rotor 50 through a one-way clutch 55.

To a right side surface of the crankcase 38, a clutch cover 58 defining a clutch chamber 59 between itself and the crankcase 38 is connected, in such a manner as to constitute a part of the engine body 32. In the crankcase 38, a transmission M is contained in which gear trains for a plurality of gear speeds, for example, 1st to 6th speed gear trains G1 to G6 capable of being selectively established are provided between first and second main shafts 60 and 61, rotatably borne on the crankcase 38 while having their axes parallel to the crankshaft 37, and a counter shaft 62.

The first and second main shafts 60 and 61 are disposed coaxially with each other. One end portion of the first main shaft 60, which rotatably penetrates a right side wall of the crankcase 38, is rotatably borne on a left side wall of the crankcase 38 through a ball bearing 63, and an other end portion of the first main shaft 60 is rotatably borne on the clutch cover 58. In addition, the second main shaft 61 coaxially surrounds the first main shaft 60, and rotatably penetrates the right side wall of the crankcase 38. A ball bearing 64 is interposed between the right side wall of the crankcase 38 and the second main shaft 61. A plurality of needle bearings 65, 65 . . . are interposed between the first and second main shafts 60 and 61.

One end portion of the counter shaft 62 protrudes from a left side wall rear portion of the crankcase 38, with a ball bearing 66 and an annular seal member 67 interposed between it and the left side wall of the crankcase 38. Besides, the other end portion of the counter shaft 62 is rotatably borne on the right side wall of the crankcase 38 through a needle bearing 68.

A 1st speed gear train G1, a 3rd speed gear train G3 and a 5th speed gear train G5 are provided between the first main shaft 60 and the counter shaft 62. A 2nd speed gear train G2, a 4th speed gear train G4 and a 6th speed gear train G6 are provided between the second main shaft 61 and the counter shaft 62.

A drive sprocket 69 is fixed to that one end portion of the counter shaft 62 which protrudes from the left side wall of the crankcase 38. By an endless chain (not shown) wrapped around the drive sprocket 69, rotational power outputted from the transmission M is transmitted to the rear wheel WR.

A primary reduction gear 70 for transmitting power from the crankshaft 37, a first hydraulic clutch 71 interposed between the primary reduction gear 70 and the first main shaft 60, and a second hydraulic clutch 72 interposed between the primary reduction gear 70 and the second main shaft 61 are contained in the clutch chamber 59.

In addition, a pulser 73 is firmly attached to an end portion of the crankshaft 37 inside the clutch chamber 59, and a rotational speed sensor 74 disposed in the clutch chamber 59 so as to face the outer periphery of the pulser 73 is fixed to the clutch cover 58.

Figure 4:
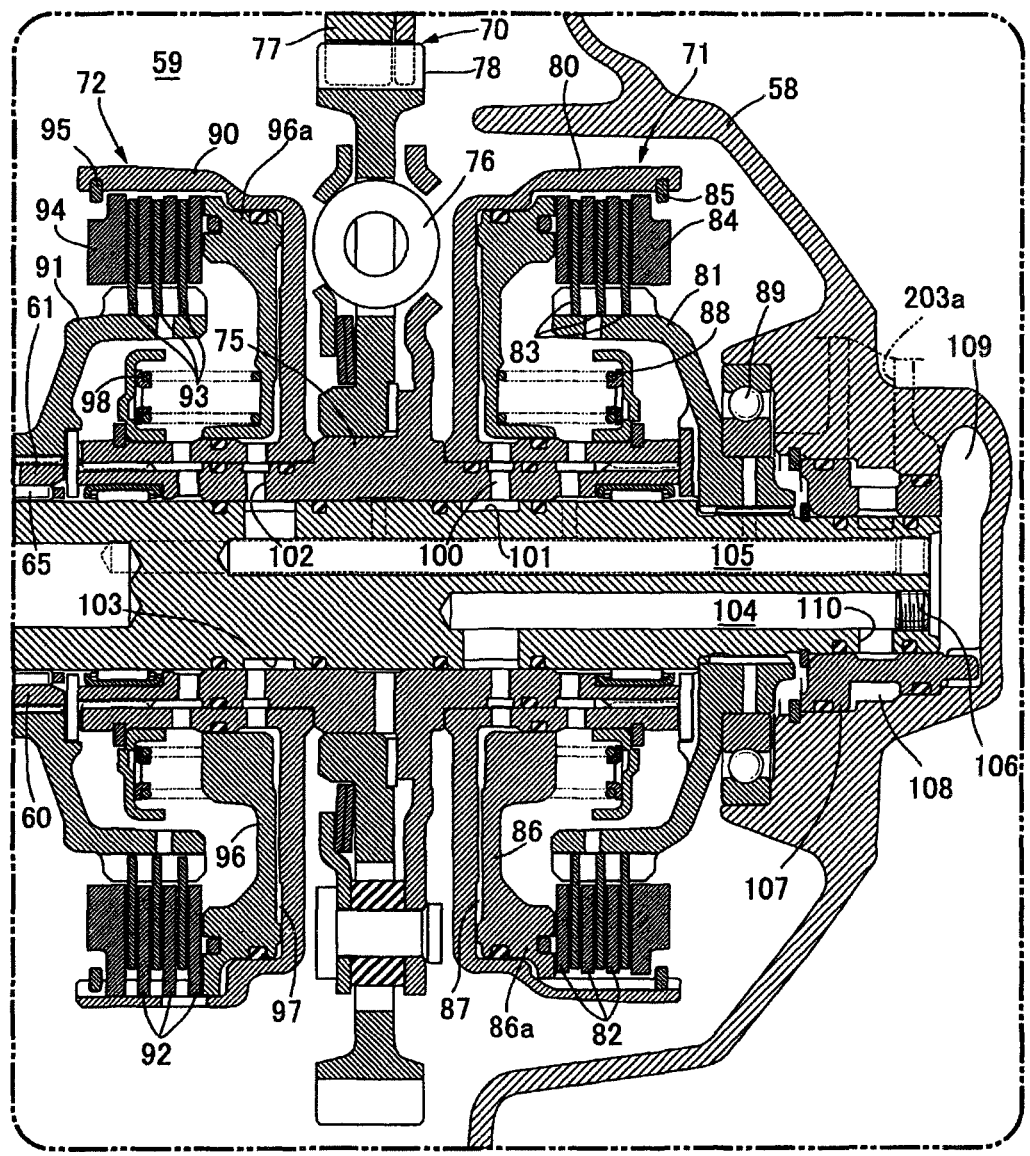
FIG. 4 is an enlarged view of the part indicated by arrow 4 of FIG. 3.

In FIG. 4, onto an intermediate portion near the other end of the first main shaft 60, a power transmission tubular shaft 75 adjacent to the second main shaft 61 in the axial direction is mounted so as to be relatively rotatable while being fixed in axial position. The first hydraulic clutch 71 is provided on the first main shaft 60 so as to be capable of permitting/interrupting transmission of power between the power transmission tubular shaft 75 and the first main shaft 60. The second hydraulic clutch 72 is provided on the power transmission tubular shaft 75 and the second main shaft 61 so as to be capable of permitting/interrupting transmission of power between the power transmission tubular shaft 75 and the second main shaft 61.

Power from the crankshaft 37 is transmitted to the power transmission tubular shaft 75 through the primary reduction gear 70 and a damper spring 76. The primary reduction gear 70 includes a primary drive gear 77 rotated together with the crankshaft 37, and a primary driven gear 78 disposed coaxially with the first and second main shafts 60 and 61 in such a manner as to be meshed with the primary drive gear 77. The primary driven gear 78 is connected to the power transmission tubular shaft 75 through the damper spring 76.

The first hydraulic clutch 71 is disposed on the right side relative to the primary reduction gear 70, and includes: a first clutch outer 80 formed in a bowl-like shape opened to the side opposite to the primary reduction gear 70 and relatively non-rotatably connected to the power transmission tubular shaft 75; a first clutch inner 81 relatively non-rotatably connected to the first main shaft 60; a plurality of first drive friction plates 82, 82 . . . axially relatively movably engaged with the first clutch outer 80; a plurality of driven friction plates 83, 83 . . . axially relatively movably engaged with the first clutch inner 81 while being disposed alternately with the first drive friction plates 82, 82 . . . ; a ring-shaped first pressure-receiving plate 84 facing the outermost friction plate of the first drive friction plates 82, 82 . . . and the first driven friction plates 83, 83 . . . disposed in pluralities and alternately; a first stop ring 85 mounted to the first clutch outer 80 so as to be capable of engagement with the first pressure-receiving plate 84 from the side opposite to the first drive friction plates 82, 82 . . . and the first driven friction plates 83, 83 . . . ; a first piston 86 which is liquid-tightly and slidably fitted to the first clutch outer 80 while being provided at an outer peripheral portion thereof with a pressure part 86a for clamping the first drive friction plates 82, 82 . . . and the first driven friction plates 83, 83 . . . between itself and the first pressure-receiving plate 84 and which defines a first oil pressure chamber 87 between itself and the first clutch outer 80; and a first clutch spring 88 which biases the first piston 86 toward the side for reducing the internal volume of the first oil pressure chamber 87. A ball bearing 89 is interposed between the first clutch inner 81 and the clutch cover 58. In other words, the other end portion of the first main shaft 60 is rotatably borne on the clutch cover 58 through the first clutch inner 81.

In a state in which no liquid pressure is acting on the first oil pressure chamber 87, the first hydraulic clutch 71 is in a clutch-OFF state (disengaged state) in which power transmission is interrupted. When a hydraulic pressure is applied to the first oil pressure chamber 87, the first hydraulic clutch 71 is in a clutch-ON state (engaged state) in which rotational power transmitted from the crankshaft 37 to the first clutch outer 80 through the primary reduction gear 70, the damper spring 76 and the power transmission tubular shaft 75 is transmitted to the first main shaft 60.

The second hydraulic clutch 72 is disposed on the crankcase 38 side relative to the first hydraulic clutch 71 so that the primary reduction gear 70 is interposed between the first hydraulic clutch 71 and the second hydraulic clutch 72. The second hydraulic clutch 72 includes: a second clutch outer 90 formed in a tubular shape opened toward the crankcase 38 side and relatively non-rotatably connected to the power transmission tubular shaft 75; a second clutch inner 91 relatively non-rotatably connected to the second main shaft 61; a plurality of second drive friction plates 92, 92 . . . axially relatively movably engaged with the second clutch outer 90; a plurality of driven friction plates 93, 93 . . . axially relatively movably engaged with the second clutch inner 91 while being disposed alternately with the second drive friction plates 92, 92 . . . ; a ring-shaped second pressure-receiving plate 94 facing the outermost friction plate of the second drive friction plates 92, 92 . . . and the second driven friction plates 93, 93 . . . disposed in pluralities and alternately; a second stop ring 95 mounted to the second clutch outer 90 so as to be capable of engagement with the second pressure-receiving plate 94 from the side opposite to the second drive friction plates 92, 92 . . . and the second driven friction plates 93, 93 . . . ; a second piston 96 which is liquid-tightly and slidably fitted to the second clutch outer 90 while being provided at an outer peripheral portion thereof with a pressure part 96a for clamping the second drive friction plates 92, 92 . . . and the second driven friction plates 93, 93 . . . between itself and the second pressure-receiving plate 94 and which defines a second oil pressure chamber 97 between itself and the second clutch outer 90; and a second clutch spring 98 which biases the second piston 96 toward the side for reducing the internal volume of the second oil pressure chamber 97.

In a state in which no liquid pressure is acting on the second oil pressure chamber 97, the second hydraulic clutch 72 is in a clutch-OFF state (disengaged state) in which power transmission is interrupted. When a hydraulic pressure is exerted on the second oil pressure chamber 97, the second hydraulic clutch 72 is in a clutch-ON state (engaged state) in which rotational power transmitted from the crankshaft 37 to the second clutch outer 90 through the primary reduction gear 70, the damper spring 76 and the power transmission tubular shaft 75 is transmitted to the second main shaft 61.

The first clutch outer 80 of the first hydraulic clutch 71 and the power transmission tubular shaft 75 are provided with a first oil passage 100 communicating with the first oil pressure chamber 87, and the first main shaft 60 is provided at the outer periphery thereof with a first annular recess 101 communicating with the first oil passage 100. In addition, the second clutch outer 90 of the second hydraulic clutch 72 and the power transmission tubular shaft 75 are provided with a second oil passage 102 communicating with the second oil pressure chamber 97, and the first main shaft 60 is provided at the outer periphery thereof with a second annular recess 103 communicating with the second oil passage 102.

In the other end portion of the first main shaft 60, mutually parallel first and second axial oil passages 104 and 105 are provided so as to be closed at their inner ends and to extend in the axial direction. The first axial oil passage 104 communicates with the first oil pressure chamber 87 through the first annular recess 101 and the first oil passage 100, while the second axial oil passage 105 communicates with the second oil pressure chamber 97 through the second annular recess 103 and the second oil passage 102. Moreover, an outer end opening portion of the first axial oil passage 104 is closed with a plug member 106, whereas the outer end of the second axial oil passage 105 is left open.

In addition, the other end portion of the first main shaft 61 is liquid-tightly fitted in a tubular member 107 which is fitted and fixed to the clutch cover 58. The tubular member 107 is provided with a communication passage 110 through which the first axial oil passage 104 communicates with an annular first oil chamber 108 formed between the outer periphery of the tubular member 107 and the clutch cover 58. Besides, a second oil chamber 109 communicating with the second axial oil passage 105 is formed between the first main shaft 60 as well as the tubular member 107 and the clutch cover 58.

Meanwhile, as indicated by broken line in FIG. 2, an oil pump unit 112 is disposed near a front part of a lower portion of the engine body 32, and an oil strainer 113 for filtration of an oil in the oil pan 42 is connected to the oil pump unit 112.

Figure 5:
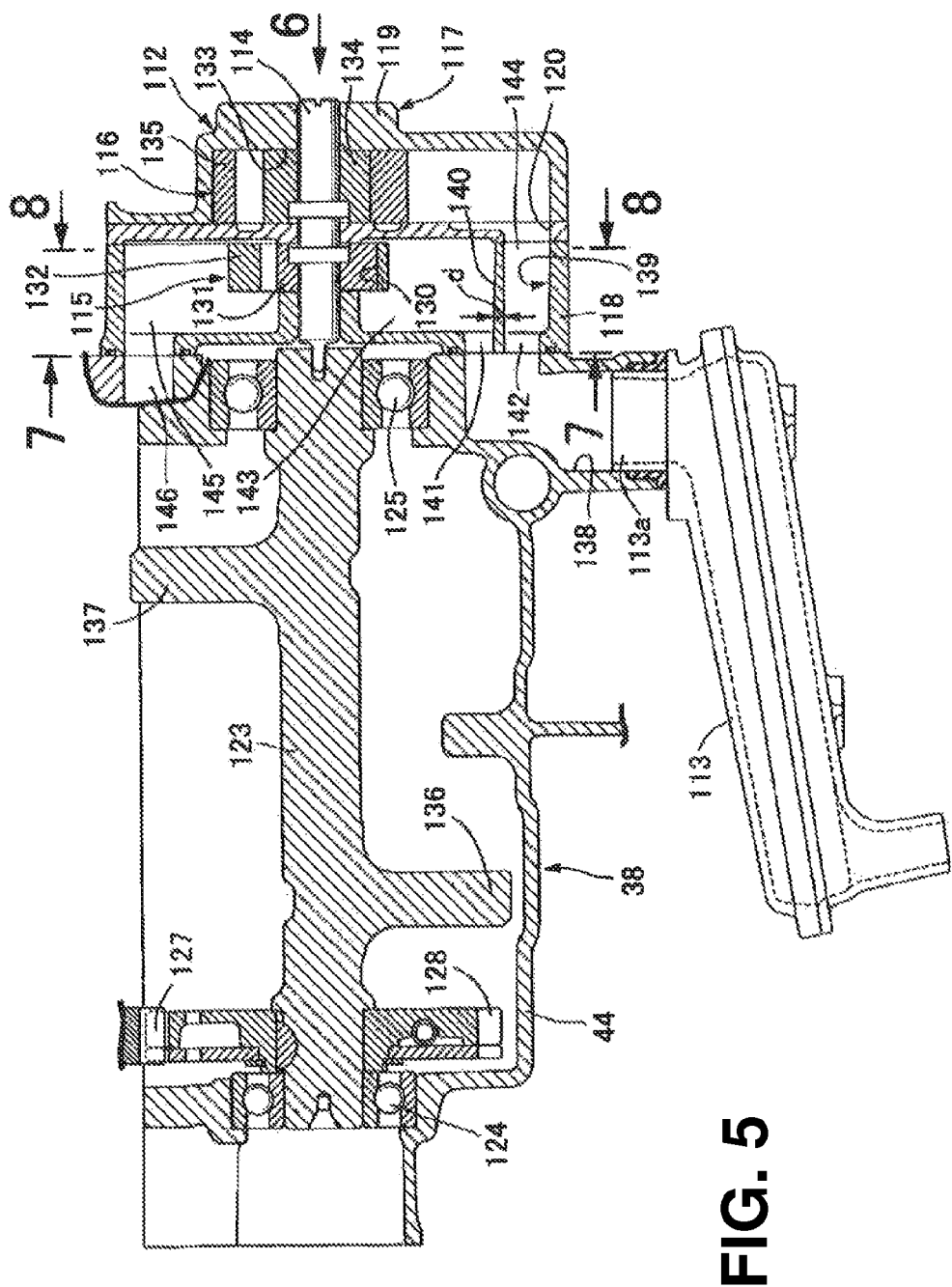
FIG. 5 is a sectional view, taken along line 5-5 of FIG. 6, of an oil pump unit and an oil strainer of the engine having the oil supply system according to the exemplary embodiment of the present invention.
Figure 6:
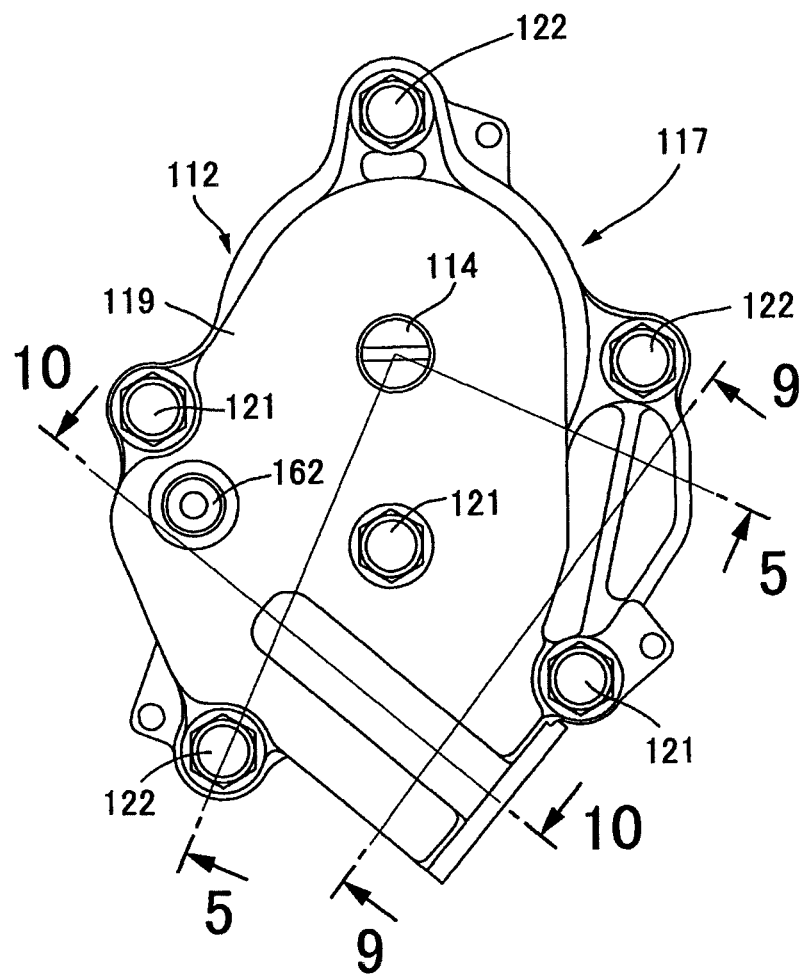
FIG. 6 is a view taken in a direction of arrow 6 of FIG. 5.

In FIGS. 5 and 6, the oil pump unit 112 includes first and second oil pumps 115 and 116 which have a common pump shaft 114 rotated interlockingly with rotation of the crankshaft 37. A pump casing 117 common to the first and second oil pumps 115 and 116 includes a pump body 118 as a first case member, a pump cover 119 as a second case member, and a flat plate-shaped plate 120 clamped between the pump body 118 and the pump cover 119. The pump casing 117 is configured by fastening the pump body 118, the plate 120 and the pump cover 119 together by a plurality of, for example three bolts 121, 121, 121. The pump casing 117 is mounted to the crankcase 38 by a plurality of, for example three bolts 122, 122, 122 in such a manner that the pump body 118 is in contact with a right side wall of the lower case half 44 of the crankcase 38.

Meanwhile, a balancer shaft 123 having an axis parallel to the crankshaft 37 is rotatably borne on the lower case half 44 of the crankcase 38, with ball bearings 124 and 125 interposed between the balancer shaft 123 and the lower case half 44. The balancer shaft 123 is coaxially and relatively non-rotatably connected to the above-mentioned pump shaft 114.

As shown in FIG. 3, a drive shaft 127 is secured to the crankshaft 37, and a driven gear 128 meshed with the drive gear 127 is fixed to the balancer shaft 123. Therefore, the pump shaft 114 is rotated interlockingly with rotation of the crankshaft 37.

The first oil pump 115 includes an inner rotor 131 fixed to the pump shaft 114, and an outer rotor 132 meshed with the inner rotor 131, the rotors 131 and 132 being contained in a first pump chamber 130 defined between the pump body 118 and the above-mentioned plate 120. Similarly, the second oil pump 116 includes an inner rotor 134 fixed to the pump shaft 114, and an outer rotor 135 meshed with the inner rotor 134, the rotors 134 and 135 being contained in a second pump chamber 133 defined between the pump cover 119 and the plate 120.

Meanwhile, the balancer shaft 123 is provided with balance weights 136 and 137 corresponding individually to the pair of cylinder bores 45 . . . in the cylinder block 39. Between the balance weight 137 (that one of the balance weights 136 and 137 which is on the pump unit 112 side) and the pump casing 117, the lower case half 44 of the crankcase 38 is provided with a connection passage 138 which is opened to the lower side at one end thereof so that a connection tubular portion 113a possessed by the oil strainer 113 is liquid-tightly fitted thereinto from below.

Figure 7:
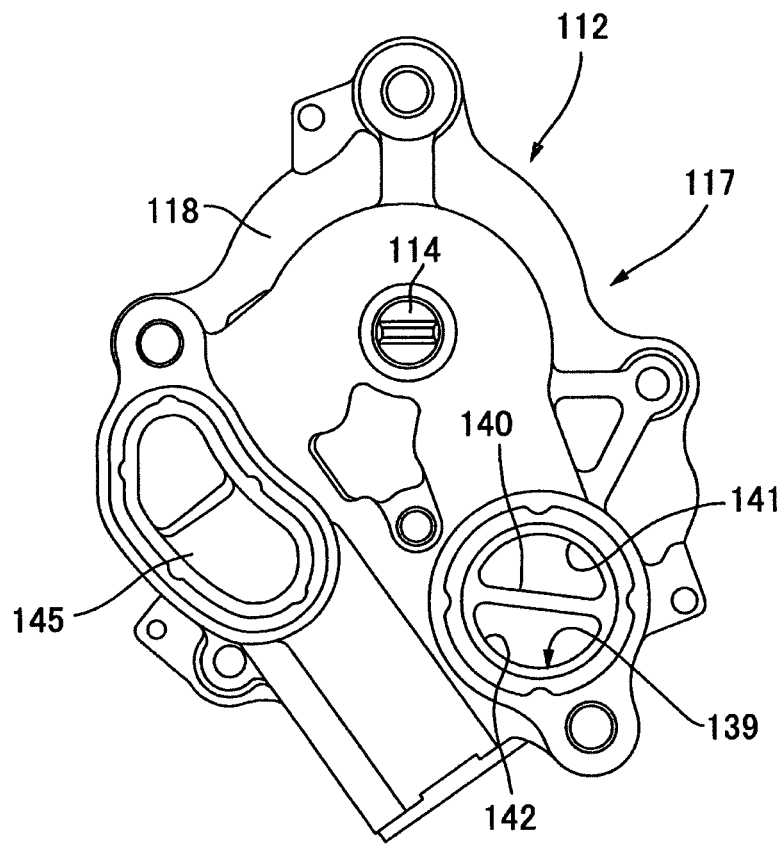
FIG. 7 is a view, taken along line 7-7 of FIG. 5, of the oil pump unit.
Figure 8:
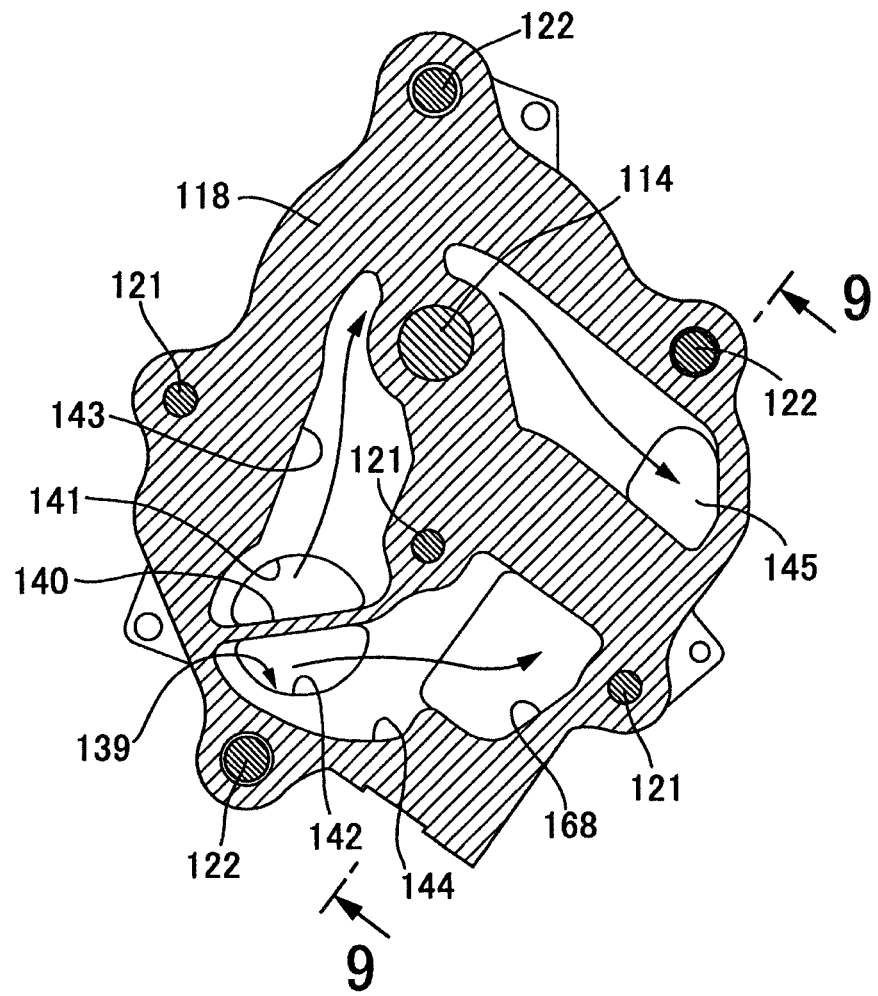
FIG. 8 is a sectional view taken along line 8-8 of FIG. 5.
Figure 9:
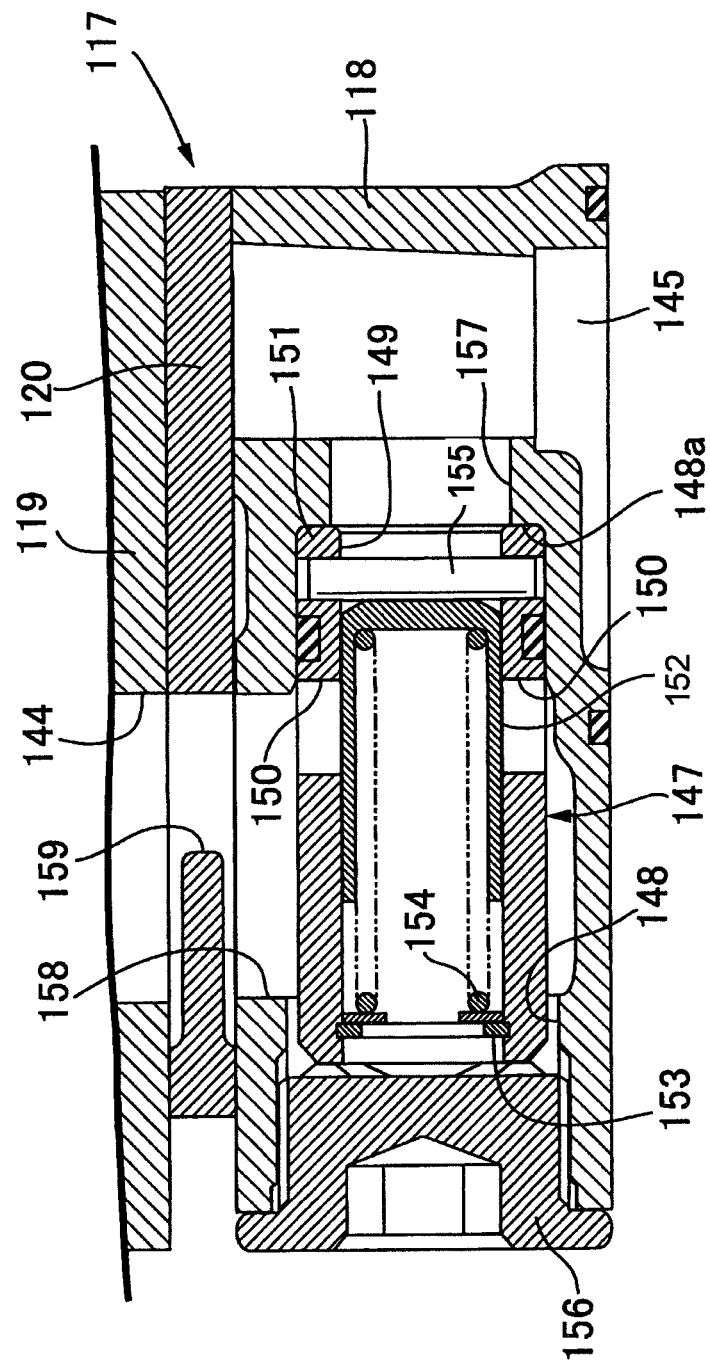
FIG. 9 is a sectional view taken along line 9-9 of FIGS. 6 and 8.

Referring to FIGS. 7 and 8 as well, the pump body 118 of the pump casing 117 is provided with a main suction port 139 which is common to the first and second oil pumps 115 and 116. The main suction port 139 is liquid-tightly connected to the other end portion of the connection passage 138. Specifically, the main suction port 139 is opened in the direction along the axis of the balancer shaft 123 and toward the inner side of the engine body 32, in such a manner that the portion for connection with the oil strainer 113 is located between the pump casing 117 and the balance weight 137 of the balancer shaft 123.

The main suction port 139 is partitioned into first and second suction ports 141 and 142 by a partition wall 140 provided integrally with the pump body 118 of the pump casing 117. The first and second suction ports 141 and 142 are commonly connected to the oil strainer 113.

In addition, the pump casing 117 is formed with a first suction passage 143 which extends from the first suction port 141 to the suction side of the first oil pump 115, and a second suction passage 144 which is formed independently of the first suction passage 143 so as to extend from the second suction port 142 to the suction side of the second oil pump 116. The first and second suction passages 143 and 144 are isolated from each other by the partition wall 140 and the above-mentioned plate 120.

Moreover, the partition wall 140 is so formed that its width d gradually increases along the direction from the plate 120 toward the main suction port 139.

Referring to FIG. 5, the pump casing 117 is formed with a first discharge passage 145 of the first oil pump 115 in such a manner as to communicate with an oil passage 146 on the crankcase 38 side. A first relief valve 147 connected to the first discharge passage 145 is attached to the pump body 118 adjacent to the plate 120.

The first relief valve 147 is contained in a bottomed relief valve containing hole 148 provided in the pump body 118. The first relief valve 147 includes: a hollow cylindrical valve housing 151 which is opened at one end thereof as an inlet 149 and is provided in an axial-directionally intermediate portion thereof with a plurality of release ports 150, 150 . . . arranged at intervals along the circumferential direction thereof; a valve body 152 which is formed in a bottomed hollow cylindrical shape closed on the inlet 149 side and is slidably fitted in the valve housing 151; a stop ring 153 fitted to the inner periphery of the other end portion of the valve housing 151; a spring 154 interposed between the stop ring 153 and the valve body 152; and a restriction pin 155 provided on the side of one end portion of the valve housing 151 in such a manner as to restrict the movement, toward the inlet 149 side, of the valve body 152 biased by the spring 154.

With the outer end of the relief valve containing hole 148, a plug member 156 is screw engaged in such a manner that the valve housing 151 is held between itself and an inner end wall 148a of the relief valve containing hole 148. The relief valve containing hole 148 is provided in the inner end wall 148a thereof with a communication hole 157 through which the inlet 149 communicates with the first discharge passage 145.

In the first relief valve 147 configured as above, when the pressure in the first discharge passage 145 is raised, the valve body 152 is retracted against the resilient force of the spring 154 to cause the inlet 149 to communicate with the release ports 150, 150 . . . , resulting in that a portion of the oil flowing through the first discharge passage 145 is released through the release ports 150, 150 . . . .

Moreover, the pump body 118 is provided, on the plate 120 side, with a communication hole 158 which communicates with the release ports 150, 150 . . . , and the plate 120 is provided with a communication hole 159 through which the communication hole 158 communicates with the second suction passage 144. Thus, the oil released from the first relief valve 147 is guided into the second suction passage 144.

Figure 10:
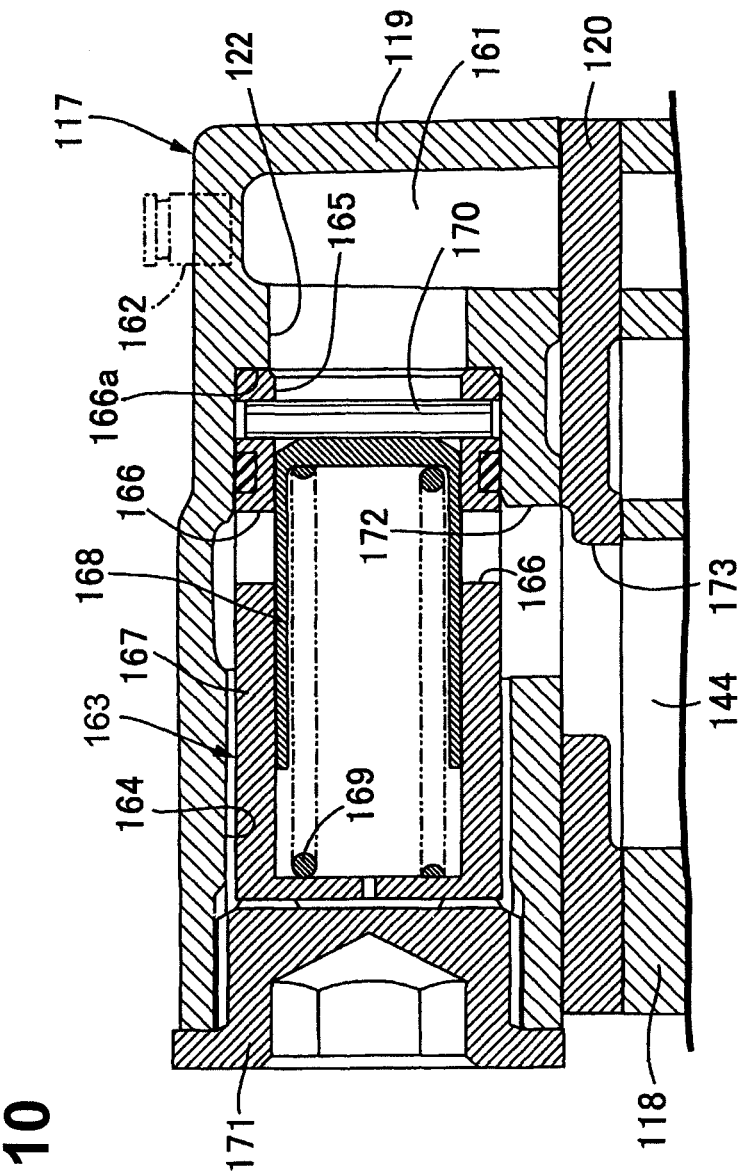
FIG. 10 is a sectional view taken alone line 10-10 of FIG. 6.

In FIG. 10, the pump casing 117 is provided, between the pump cover 119 and the plate 120, with a second discharge passage 161 of the second oil pump 116. A connection pipe 162 communicating with the second discharge passage 161 is attached to the pump cover 119 in such a manner as to project toward the clutch cover 58 side. In addition, a second relief valve 163 connected to the second discharge passage 161 is attached to the pump cover 119.

The second relief valve 163 is contained in a bottomed relief valve containing hole 164 provided in the pump cover 119. The second relief valve 163 includes: a bottomed hollow cylindrical valve housing 167 which is opened at one end thereof as an inlet 165 and is provided in an axial-directionally intermediate portion thereof with a plurality of release ports 166, 166 . . . arranged at intervals along the circumferential direction thereof; a valve body 168 which is formed in a bottomed hollow cylindrical shape closed on the inlet 165 side and is slidably fitted in the valve housing 167; a spring 169 interposed between a closed other end portion of the valve housing 167 and the valve body 168; and a restriction pin 170 provided on the side of one end portion of the valve housing 167 in such a manner as to restrict the movement, toward the inlet 165 side, of the valve body 168 biased by the spring 169.

With the outer end of the relief valve containing hole 164, a plug member 171 is screw engaged in such a manner that the valve housing 167 is held between itself and an inner end wall 166a of the relief valve containing hole 164. The relief valve containing hole 164 is provided in the inner end wall 166a thereof with a communication hole 122 through which the inlet 165 communicates with the second discharge passage 161.

In the second relief valve 163 configured as above, when the pressure in the second discharge passage 161 is raised, the valve body 168 is retracted against the resilient force of the spring 169 to cause the inlet 165 to communicate with the release ports 166, 166 . . . , resulting in that a portion of the oil flowing through the second discharge passage 161 is released through the release ports 166, 166 . . . .

Moreover, the pump cover 119 is provided, on the plate 120 side, with a communication hole 172 which communicates with the release ports 166, 166 . . . , and the plate 120 is provided with a communication hole 173 through which the communication hole 172 communicates with the second suction passage 144. Thus, the oil released from the second relief valve 163 is guided into the second suction passage 144.

Figure 11:
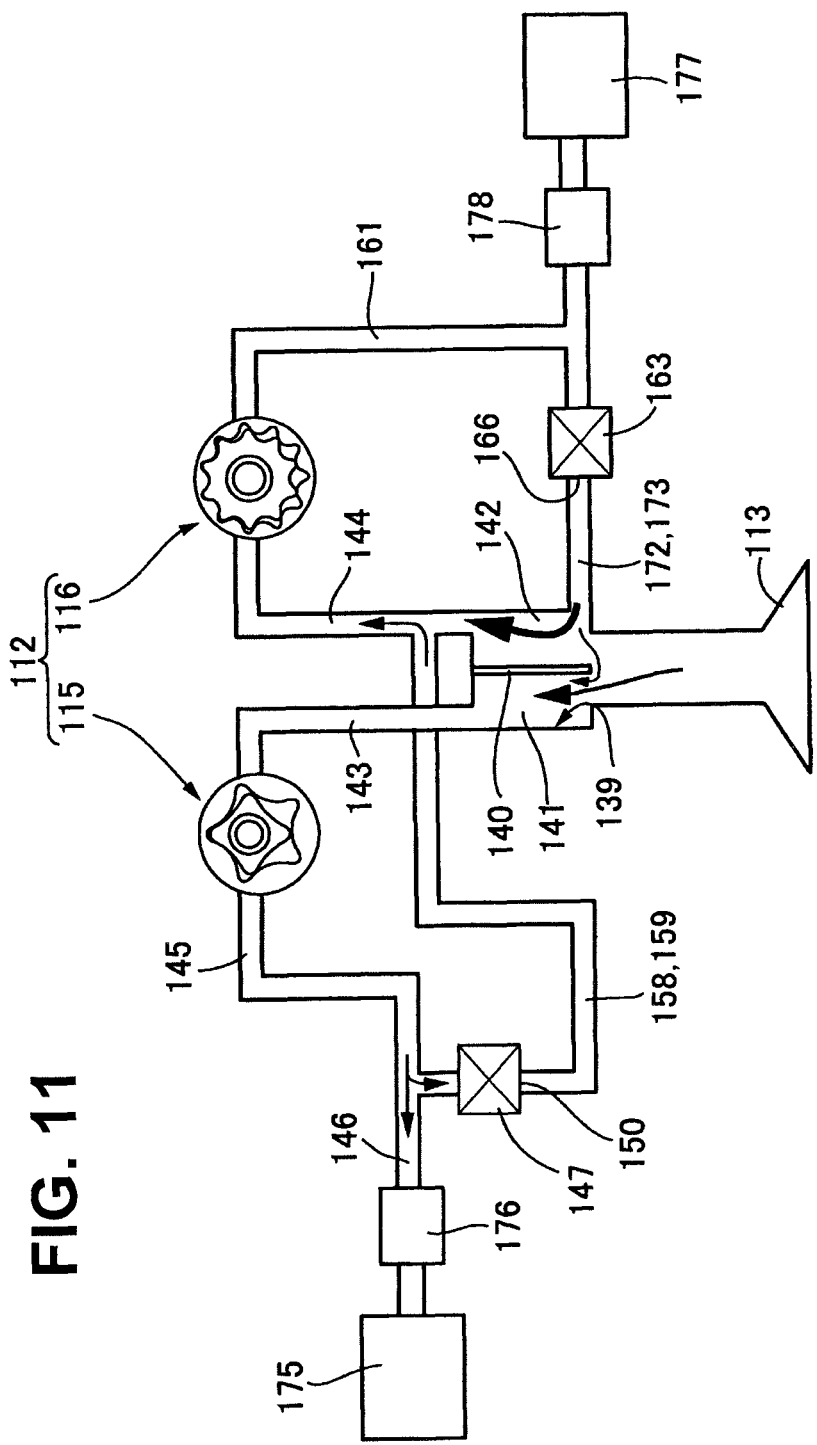
FIG. 11 is a view showing the configuration of an oil supply system according to an exemplary embodiment of the present invention.

In FIG. 11, the first oil pump 115 is for supplying a lubricating oil to a plurality of to-be-lubricated parts 175 of the engine body 32 through a first oil filter 176, whereas the second oil pump 116 is for supplying a control oil to an oil pressure controller 177 of the transmission M through a second oil filter 178. As shown in FIG. 2, the first oil filter 176 is attached to a front wall lower portion of the crankcase 38 of the engine body 32, whereas the second oil filter 178 is attached to a front side lower portion of the clutch cover 58.

Figure 12:
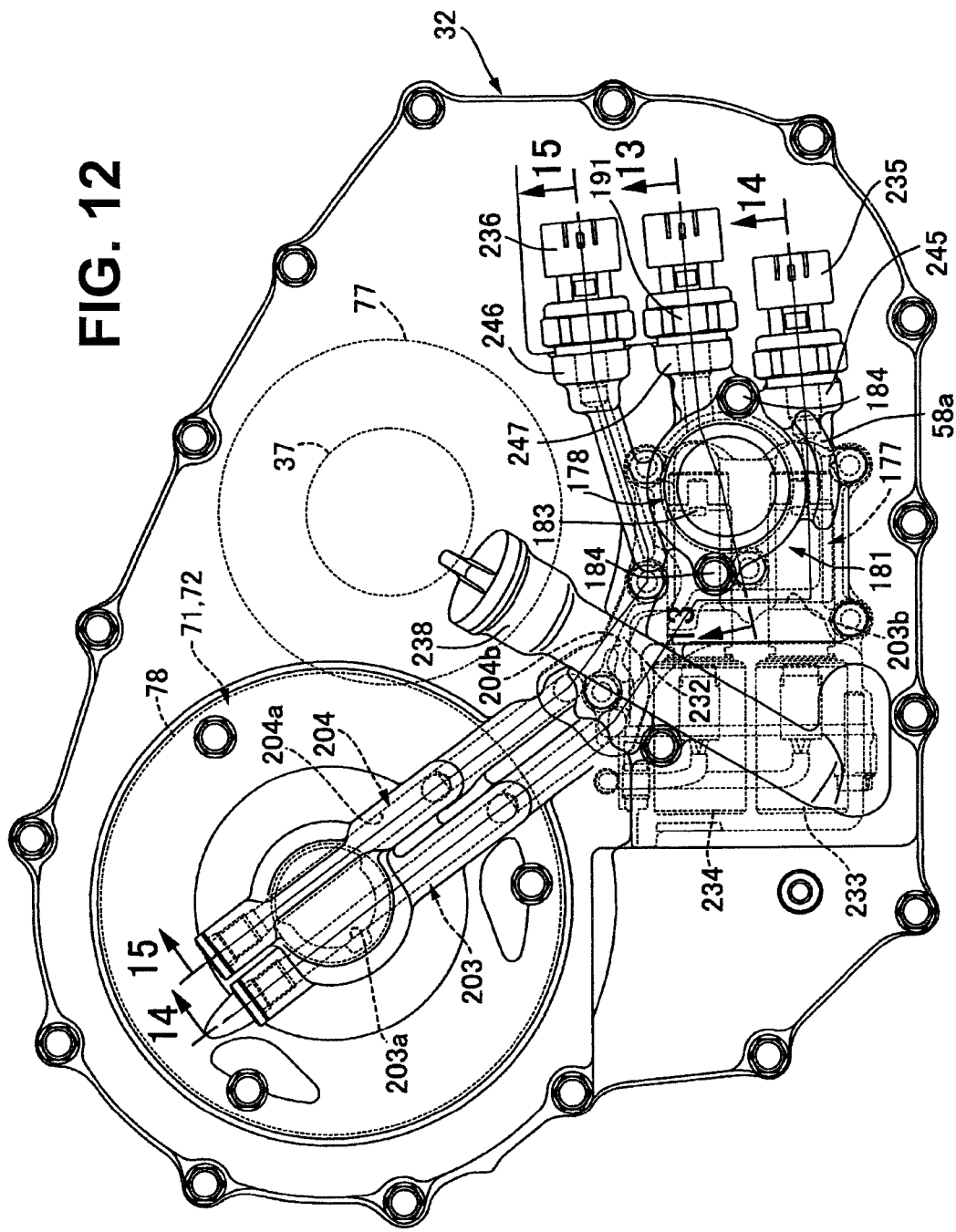
FIG. 12 is an enlarged view of a major part of FIG. 2.
Figure 13:
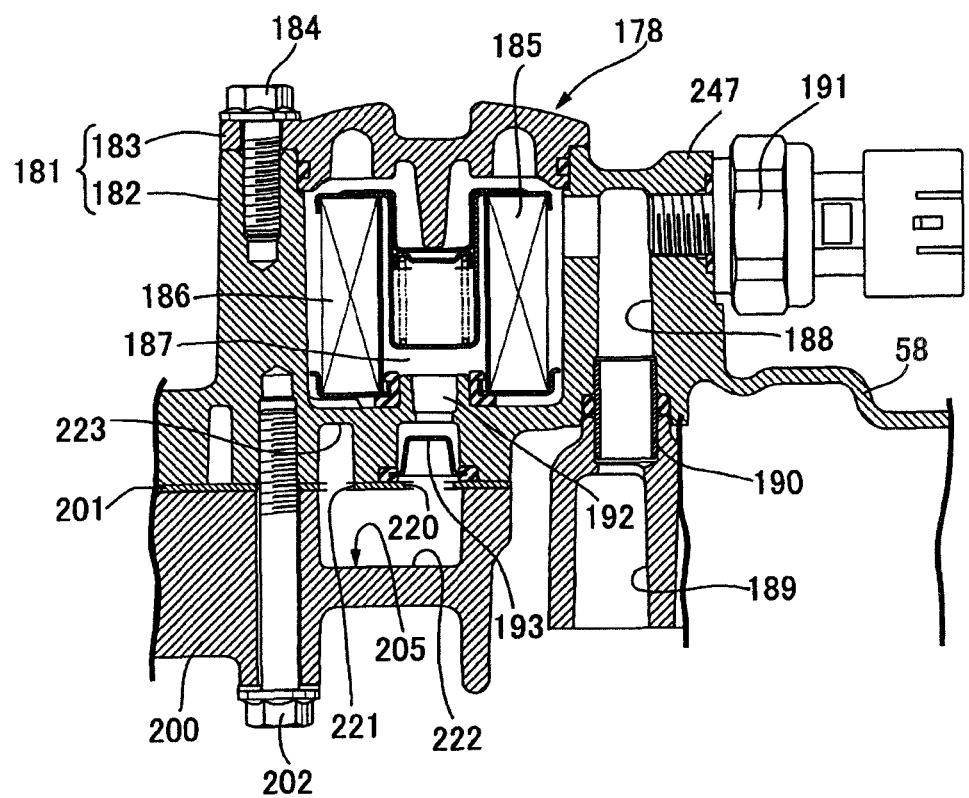
FIG. 13 is a sectional view taken along line 13-13 of FIG. 12.

In FIGS. 12 and 13, a filter case 181 of the second oil filter 178 is a hollow cylindrical member which includes a bottomed hollow cylindrical case main part 182 formed integrally with the clutch cover 58, and a cap member 183 connected to the case main part 182 by, for example, a pair of bolts 184, 184. A filter medium 185 formed in a ring-like shape is inserted and held in the filter case 181. An unclean chamber 186 is formed between the outer periphery of the filter medium 185 and the filter case 181, while a clean chamber 187 is formed inside the filter medium 185.

An inlet-side passage 188 communicating with the unclean chamber 186 is provided in a side wall of the case main part 182. A connection passage 189 communicating with the second discharge passage 161 of the second oil pump 116 communicates with the inlet passage 188 through a connection pipe 190. The oil discharged from the second oil pump 116 is supplied into the unclean chamber 186.

Moreover, an oil filter oil pressure sensor 191 for detecting the pressure of oil supplied into the second oil filter 178 is attached to the case main part 182 of the filter case 181, with its tip fronting on the inlet passage 188 and with its axis orthogonal to the axis of the hollow cylindrical filter case 181.

In addition, as shown in FIG. 13, the outer end of the cap member 183 is disposed on the outer side relative to the outer end of the oil filter oil pressure sensor 191 along the axial direction of the filter case 181 of the second oil filter 178.

Besides, the clutch cover 58 is provided with an outlet passage 192 communicating with the clean chamber 187, and a filter 193 is mounted in the outlet passage 192.

Figure 14:
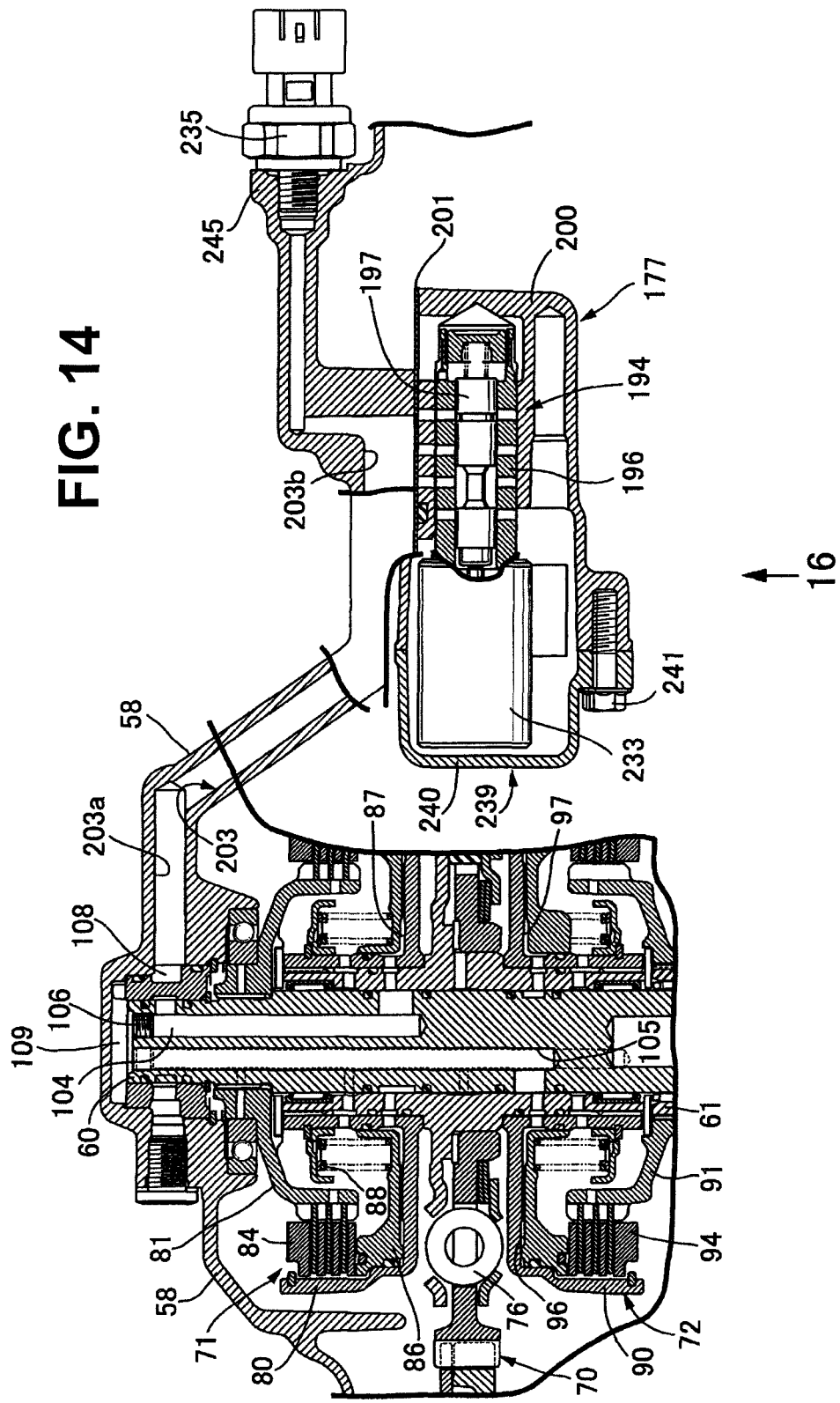
FIG. 14 is a sectional view taken along line 14-14 of FIG. 12.
Figure 15:
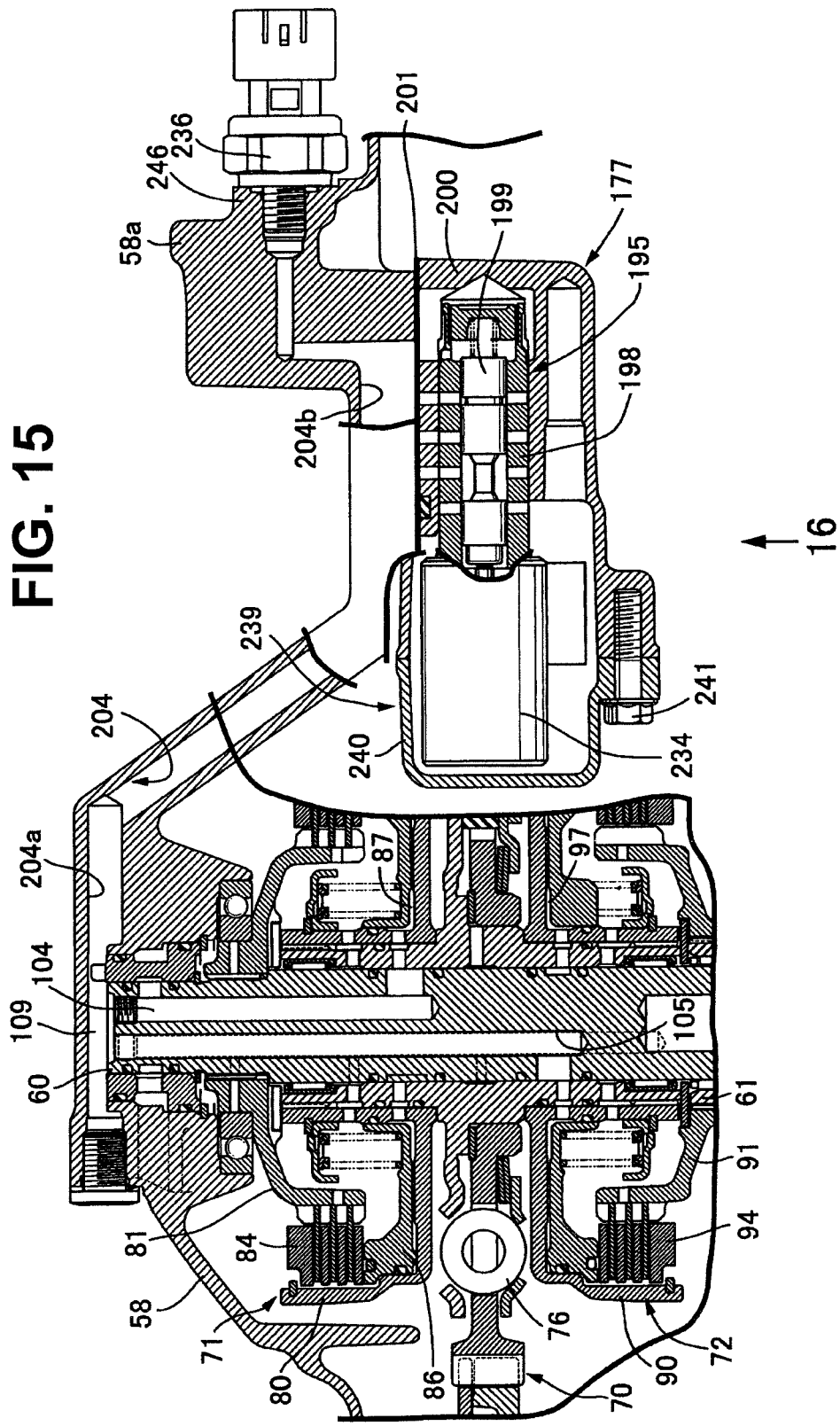
FIG. 15 is a sectional view taken along line 15-15 of FIG. 12.
Figure 16:
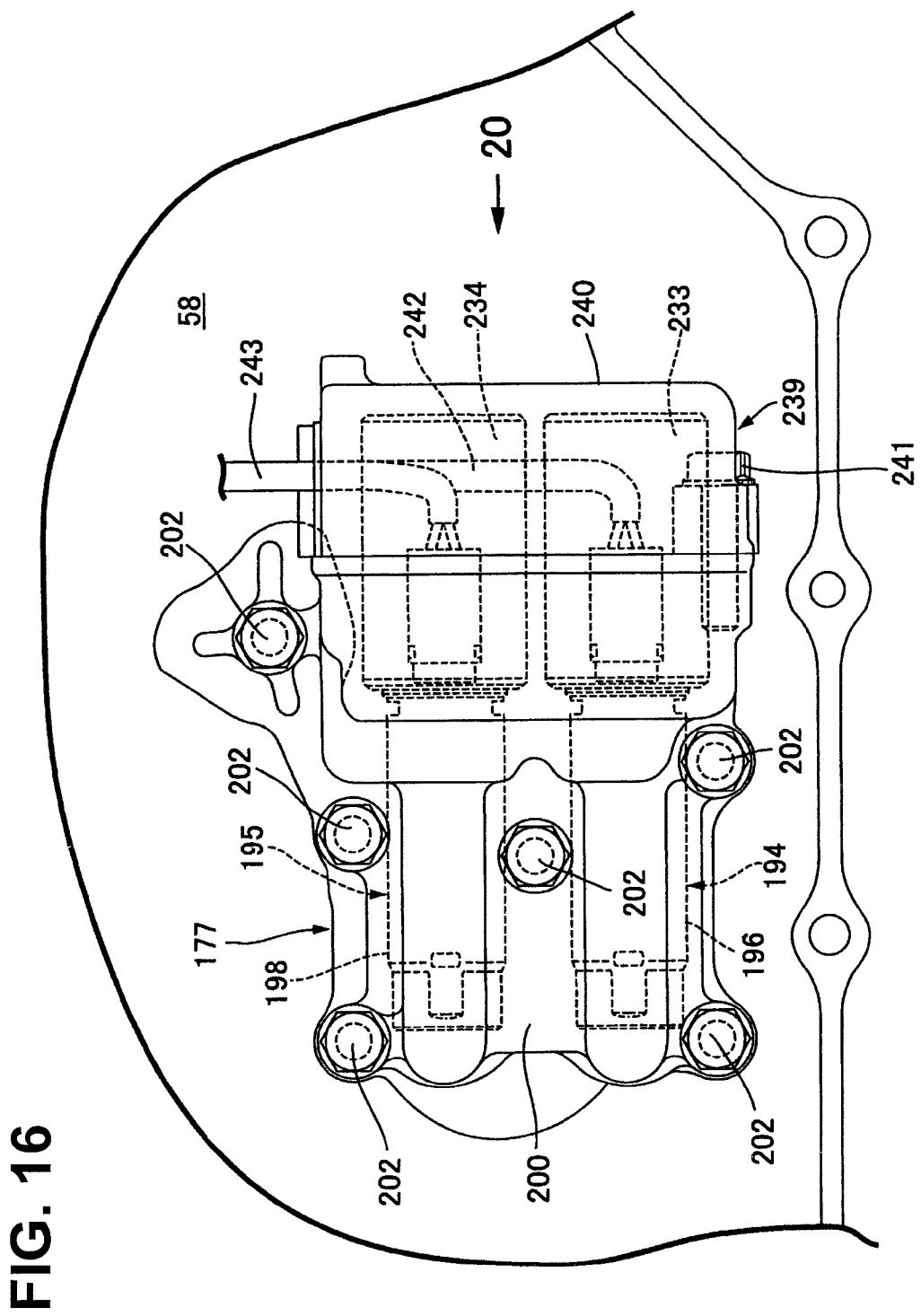
FIG. 16 is a view taken along arrow 16 of FIGS. 14 and 15.

Referring to FIGS. 14 to 16 as well, the oil pressure controller 177 of the transmission M includes a first oil pressure control valve 194 for controlling the oil pressure in the first hydraulic clutch 71, and a second oil pressure control valve 195 for controlling the oil pressure in the second hydraulic clutch 72, and is disposed on the inner surface side of the clutch cover 58. Moreover, the first and second oil pressure control valves 194 and 195 are linear solenoid valves including valve housings 196 and 198 and spool valve bodies 197 and 199 contained in the valve housings 196 and 198, respectively.

The first and second oil pressure control valves 194 and 195 are inserted and held in a support holder 200 in parallel to each other. The support holder 200 is mounted to the inner surface side of the clutch cover 58 so that a flat plate-shaped partition member 201 is interposed between the clutch cover 58 and the valve housings 196 and 198. In the condition where the support holder 200 is mounted to the clutch cover 58, the axes of the first and second control valves 194 and 195 are horizontal. Moreover, the support holder 200 is mounted to the clutch cover 58 so as to clamp the partition member 201 between itself and the inner surface of the clutch cover 58, by a plurality of, for example six bolts 202, 202 . . . .

Meanwhile, the first and second oil pressure control valves 194 and 195 and the first and second hydraulic clutches 71, 72 are individually interconnected through first and second control oil supply passages 203 and 204, respectively. First and second cover-side oil supply passages 203a and 204a constituting part of the first and second control oil supply passages 203 and 204 are provided in the clutch cover 58 so as to be inclined rearwardly upward from the oil pressure controller 177 toward the first main shaft 60 side. The downstream end of the first cover-side oil supply passage 203a communicates with a first oil chamber 108 communicating with the first oil pressure chamber 87 of the first hydraulic clutch 71, and the downstream end of the second cover-side oil supply passage 204a communicates with a second oil chamber 109 communicating with the second oil pressure chamber 97 of the second hydraulic clutch 72.

On both surface sides of the partition member 201, namely, on the surface of the partition member 201 on the clutch cover 58 side and on the surface of the partition member 201 on the support holder 200 side, first and second control valve-side oil supply passages 203b and 204b are formed. These passages, which cross each other, respectively or individually communicate with the first and second cover-side oil supply passages 203a and 204a so as to constitute the first and second control oil supply passages 203 and 204, respectively. An oil supply passage 205 (see FIG. 13) extending from the second oil filter 178 to the first and second oil pressure control valves 194 and 195 is formed.

Figure 17:
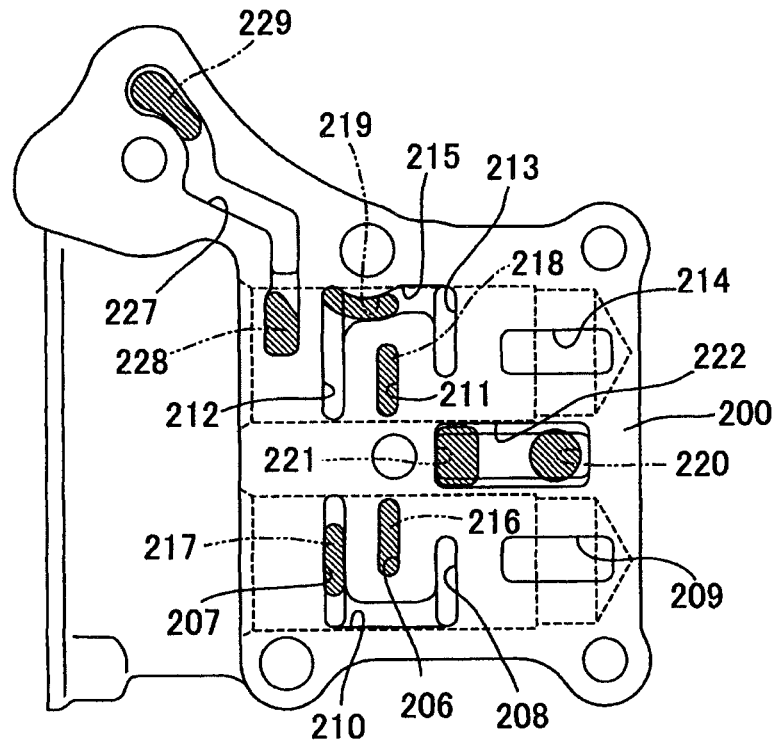
FIG. 17 is a view showing a surface fronting on a partition member of a support holder, in which communication parts for communication with holes in the partition member are hatched.

In FIG. 17, the support holder 200 is provided with an inlet hole 206, an outlet hole 207, a feedback hole 208 and a relief hole 209 communicating respectively with an inlet port, an outlet port, a feedback port and a drain port of the first oil pressure control valve 194. The support holder is also provided with an inlet hole 211, an outlet hole 212, a feedback hole 213 and a relief hole 214 communicating respectively with an inlet port, an outlet port, a feedback port and a drain port of the second oil pressure control valve 195. In addition, the support holder 200 is provided, in its surface fronting on the partition member 201, with a groove 210 interconnecting the outlet hole 207 and the feedback hole 208, and with a groove 215 interconnecting the outlet hole 212 and the feedback hole 213.

Figure 18:
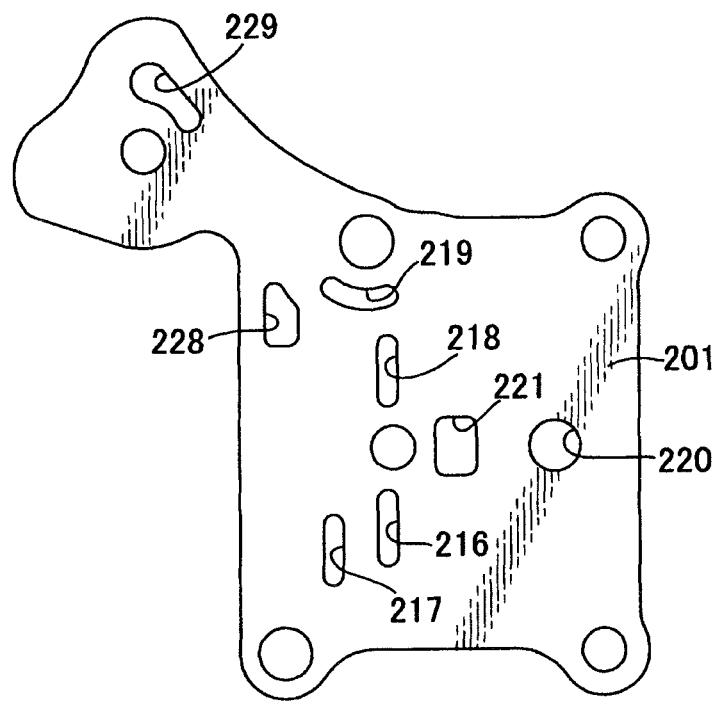
FIG. 18 is a side view, as viewed from the side of a clutch cover, of the partition member.

On the other hand, as shown in FIG. 18, through-holes 216 and 217 are provided in the partition member 201 and correspond respectively to the inlet hole 206 and the outlet hole 207 provided in the support holder 200 on the first oil pressure control valve 194 side in such a manner as to communicate respectively with the inlet hole 206 and the outlet hole 207 as indicated by hatching in FIG. 17 when the partition member 201 is sandwiched between the support holder 200 and the clutch cover 58. Besides, through-holes 218 and 219 are provided in the partition member 201 and correspond respectively to the inlet hole 211 and the outlet hole 212 provided in the support holder 200 on the second oil pressure control valve 195 side in such a manner as to communicate respectively with the inlet hole 211 and the outlet hole 212 as indicated by hatching in FIG. 17 when the partition member 201 is sandwiched between the support holder 200 and the clutch cover 58.

Figure 19:
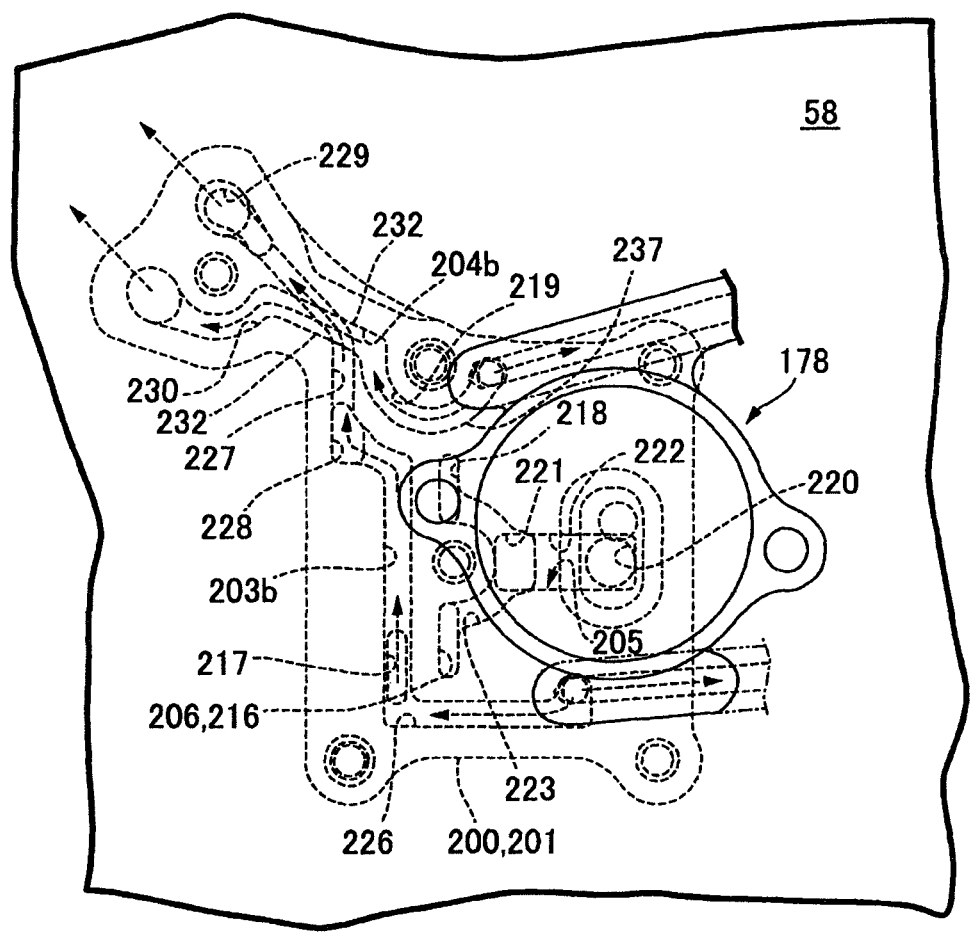
FIG. 19 is a view, as viewed from the side of an outer surface of the clutch cover, of layout of a control valve-side oil supply passage.

In addition, the partition member 201 is provided with a through-hole 220 communicating with the outlet passage 192 of the second oil filter 177, and a through-hole 221 communicating with the other end of a groove 222 which is directed toward a surface, fronting on the partition member 201, of the support holder 200 so as to communicate with the through-hole 220 at one end thereof and to extend in the direction along the axes of the first and second oil pressure control valves 194 and 195. As shown in FIG. 19, a surface, fronting on the partition member 201, of the clutch cover 58 is provided with a groove 223 which is so curved as to cause the through-hole 221 to communicate with the through-holes 216 and 218.

The oil supply passage 205 leading from the second oil filter 178 to the first and second oil pressure control valves 194 and 195 is composed of the through-hole 220 in the partition member 201, the groove 222 in the support holder 200, the through-hole 221 in the partition member 201, the groove 223 in the clutch cover 58, the through-holes 216 and 218 in the partition member 201, and the inlet holes 206 and 211 in the support holder 200. Part of the oil supply passage 205 is composed of grooves 222 and 223 which are provided in the support holder 200 and the clutch cover 58 while fronting respectively on both surfaces of the partition member 201.

A surface, fronting on the partition member 201 side, of the support holder 200 and a surface, fronting on the partition member 201, of the clutch cover 58 are provided with grooves 226 and 227 which constitute the first and second control valve-side oil supply passages 203b and 204b in cooperation with both surfaces of the partition member 201.

Specifically, the clutch cover 58 is provided, in its surface fronting on the partition member 201, with the groove 226 which communicates with the outlet hole 207 in the support holder 200 through the through-hole 220 in the partition member 201. The groove 226 communicates with a through-hole 228 provided in the partition member 201. In addition, the support holder 200 is provided, in its surface fronting on the partition member 201, with the groove 227 which communicates with the through-hole 228 at one end thereof. A through-hole 229 communicating with the other end of the groove 227 is provided in the partition member 201. The through-hole 229 communicates with the first cover-side control oil supply passage 203a.

In addition, the clutch cover 58 is provided, in its surface fronting on the partition member 201, with a groove 230 which constitutes the second control valve-side oil supply passage 204b in cooperation with the surface, on the clutch cover 58 side, of the partition member 201.

Specifically, the clutch cover 58 is provided, in its surface fronting on the partition member 201, with the groove 230 which communicates with the outlet hole 212 in the support holder 200 through the through-hole 219 in the partition member 201, and the groove 230 communicates with the second cover-side control oil supply passage 204a.

Moreover, the first and second control valve-side oil supply passages 203b and 204b cross each other. The groove 227 provided in the support holder 200 so as to constitute a part of the first control valve-side oil supply passage 203b and the groove 230 provided in the clutch cover 58 so as to constitute a part of the second control valve-side oil supply passage 204b are disposed respectively on both sides of the partition member 201, which ensures that the first and second control valve-side oil supply passages 203b and 204b cross each other. The crossing part 232 of them is disposed outside the range of projection of the first and second oil pressure control valves 194 and 195 to the axial direction of the crankshaft 37.

Meanwhile, solenoids 233, 234 as actuators for actuating the spool valve bodies 197 and 199 are added to the first and second oil pressure control valves 194 and 195. The first and second oil pressure control valves 194 and 195 with the solenoids 233, 234 thus added thereto are disposed under the primary drive gear 77 arranged at an axial end of the crankshaft 37, in side view as viewed in the direction along the axis of the crankshaft 37. The first and second control valve-side oil supply passages 203b, 204b are disposed so as to cross each other between the solenoids 233, 234 and the primary drive gear 77 in side view. In other words, the crossing part 232 is disposed between the solenoids 233, 234 and the primary drive gear 77 in side view.

In addition, first and second clutch oil pressure sensors 235 and 236 are individually disposed at end portions, on the side opposite to the first and second cover-side oil supply passages 203a and 204a, of the first and second control valve-side oil supply passages 203b and 204b. The first and second clutch oil pressure sensors 235 and 236 are disposed on the clutch cover 58 of the engine body 32 in parallel to and proximate to each other, with their axes oriented in the back-and-forth direction in the condition where the engine body 32 is mounted on the motorcycle.

Besides, the second oil filter 178 having the hollow cylindrical filter case 181 is disposed on the clutch cover 58. In this case, the second oil filter 178 is disposed on the clutch cover 58 so that the axis of the filter case 181 thereof is disposed in a direction crossing the axes of the first and second clutch oil pressure sensors 235 and 236, and that it is positionally deviated from the first and second clutch oil pressure sensors 235 and 236 in the back-and-forth direction in the condition where the engine body 32 is mounted on the motorcycle.

Moreover, the first and second clutch oil pressure sensors 235 and 236 and the above-mentioned oil filter oil pressure sensor 191 are disposed in parallel to each other, in such a manner that the oil filter oil pressure sensor 191 is interposed between the first and second clutch oil pressure sensors 235 and 236.

Moreover, as shown in FIGS. 12 and 15, a projecting portion 58a projecting to the outer side relative to the first clutch oil pressure sensor 235 (which is the lowest one of the first clutch oil pressure sensor 235, the second clutch oil pressure sensor 236 and the oil filter oil pressure sensor 191) is provided on the clutch cover 58 in such a manner as to be located in the vicinity of the first clutch oil pressure sensor 235.

In addition, as shown in FIGS. 2 and 12, front surface lower portions of the crankcase 38 and the clutch cover 58 of the engine body 32 are so curved that a lower portion is located on the more rearward side. A mounting boss 245 for mounting the first clutch oil pressure sensor 235 to the clutch cover 58 of the engine body 32 is disposed at a position deviated rearward in relation to mounting bosses 246 and 247 for mounting the second clutch oil pressure sensor 236 and the oil filter oil pressure sensor 191 to the clutch cover 58.

The first clutch oil pressure sensor 235, the second clutch oil pressure sensor 236 and the oil filter oil pressure sensor 191 are disposed on the clutch cover 58, which is a side wall of the engine body 32 on the axial-directionally one end side of the crankshaft 37. In this case, the first clutch oil pressure sensor 235, the second clutch oil pressure sensor 236 and the oil filter oil pressure sensor 191 are disposed forwardly of the crankshaft 37 and below the first and second hydraulic clutches 71 and 72.

Besides, a lubricating oil pressure sensor 248 for detecting the supply oil pressure of the lubricating oil supplied to the plurality of to-be-lubricated parts 175 of the engine body 32 is mounted to the front surface of the crankcase 38 of the engine body 32 so as to be disposed forwardly of the first clutch oil pressure sensor 235, the second clutch oil pressure sensor 236 and the oil filter oil pressure sensor 191.

In addition, the second control valve-side oil supply passage 204b is formed at a part thereof with a semicircular arcuate part 237, along one bolt 202 of the six bolts 202, 202 . . . for fastening the support holder 200 (which clamps the partition member 201 between itself and the clutch cover 58) to the clutch cover 58, in such a manner as to bypass the one bolt 202. The through-hole 219 provided in the partition member 201 and the groove 230 provided in the clutch cover 58 are so formed as to constitute the arcuate part 237.

Meanwhile, as shown in FIG. 12, a level gauge insertion tube 238 extending upward from a lower portion of the clutch cover 58 to be located rearwardly of the second oil filter 178 is disposed on the outer side of the clutch cover 58, correspondingly to the part where the first and second control valve-side oil supply passages 203b and 204b cross each other, namely, the crossing part 232.

Figure 20:
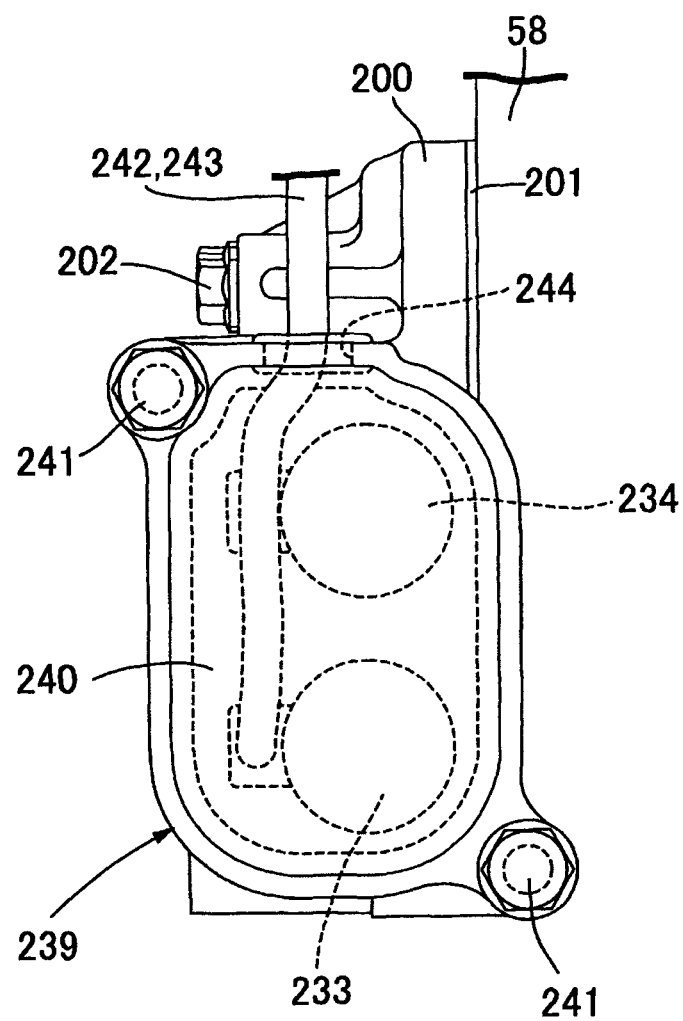
FIG. 20 is a view taken along arrow 20 of FIG. 16.

Referring to FIG. 20 also, the support holder 200 is provided with a containing part 239 for containing the solenoids 233, 234 in such a manner that it is defined by the support holder 200 and a cover member 240 fastened to the support holder 200 by bolts 241, 241. Besides, a cable lead-out hole 244 through which to lead out cables 242 and 243 connected to the solenoids 233 and 234 is provided at an upper portion of the containing part 239 and rearwardly of the first and second control valve-side oil supply passages 203b and 204b.

Now, operation of the present embodiment will be described below. The main suction port 139 common to the first and second oil pumps 115 and 116 is partitioned by the partition wall 140 into the first suction port 141 of the first suction passage 143 communicating with the first oil pump 115 and the second suction port 142 of the second suction passage 144 being independent of the first suction passage 143 and communicating with the second oil pump 116 side. In addition, the release ports 150 and 166 of the first and second relief valves 147 and 163 are connected to the second suction passage 144 on the second oil pump 116 side. Therefore, the oil released through the first relief valve 147 of the first oil pump 115 is also sucked into the second oil pump 116. Accordingly, even in the case where an oil circulating circuit is composed on the second oil pump 116 side, if an overflow of the oil from the circulating circuit to the side of the suction passage of the first oil pump 115 occurs, the amount of the oil drawn in to the second oil pump 116 side is reduced. Consequently, in the case where the oil contains much air mixed therein, influence of the air can be prevented from being produced on the second oil pump side 116, and the first oil pump 115 can be prevented from being enlarged in size.

Since the first and second suction ports 141 and 142 are commonly connected to the single oil strainer 113 common to the first and second oil pumps 115 and 116, the number of component parts can be reduced in comparison to an arrangement using multiple strainers.

The lubricating oil is supplied to the to-be-lubricated parts 175 of the engine body 32 by the first oil pump 115, whereas the oil pressure control oil is supplied to the oil pressure controller 177 of the transmission M by the second oil pump 116. Thus, the quantity of oil supplied to the to-be-lubricated parts 175 of the engine body 32 can be prevented from becoming insufficient, in the condition where the oil circulating circuit is composed on the second oil pump 116 side when the oil pressure controller 177 is not operated. In this case, the oil sucked in through the oil strainer 113 is substantially entirely sucked in by the first oil pump 115. This structure ensures that even where the oil with air mixed therein is sucked from the oil strainer 113, the air-mixed oil can easily be led to the side of the to-be-lubricated parts 175 of the engine body 32 where the supply of the air-mixed oil would not produce any problem.

The pump casing 117 is composed of the pump body 118 and the pump cover 119 and the plate 120, which is clamped between the pump body 118 and the pump cover 119 so as to define the pump chambers 130 and 133 of the first and second oil pumps 115 and 116 between the pump body 118 and the pump cover 119. The first and second suction passages 143 and 144 are isolated from each other by the plate 120 and the partition wall 140 provided integrally with the pump body 118, which is one part of the pump casing 117. Therefore, the structure in which the first and second suction passages 143 and 144 are formed inside the pump casing 117 in a mutually isolated fashion can be configured simply.

The communication hole 159 through which the release port 150 of the first relief valve 147 communicates with the second suction passage 144 is provided in the plate 120 adjacent to the first relief valve 147. This ensures that the oil discharged from the first relief valve 147 can be led into the second suction passage 144 with a simple structure.

The partition wall 140 is so disposed as to partition the main suction port 139 into the upper and lower portions in the condition where the engine body 32 is mounted on the motorcycle. This ensures that even when the oil in the main suction port 139 is distributed unevenly in the back-and-forth direction due to an acceleration or deceleration of the motorcycle, the quantities of the oil flowing through the first and second suction passages 143 and 144 can be prevented from being changed.

In addition, the main suction port 139 is connected to the oil strainer 113 between the pump casing 117 and the balance weight 137 provided on the balancer shaft 123 connected to the pump shaft 114 in a coaxial and relatively non-rotatable manner. Thus, the main suction port can be connected to the oil strainer 113 while effectively utilizing the space between the balance weight 137 and the pump casing 117.

Moreover, the width d of the partition wall 140 gradually increases along the direction toward the main suction port 139 side, so that it is possible to enhance the rigidity of the partition wall 140 at its tip portion on which the sucked-in oil impinges.

The clutch cover 58 constituting a part of the engine body 32 and covering the first and second hydraulic clutches 71 and 72 is provided with the first and second cover-side oil supply passages 203a and 204a which individually interconnect the first and second oil pressure control valves 194 and 195 and the first and second hydraulic clutches 71 and 72. The partition member 201 is interposed between the clutch cover 58 and the valve housings 196 and 198 of the first and second oil pressure control valves 194 and 195. The first and second control valve-side oil supply passages 203b and 204b communicate individually and respectively with the first and second cover-side control oil supply passages 203a and 204a so as to constitute the first and second control oil supply passages 203 and 204. Also, the passages 203b, 204b cross each other and are formed on both surface sides of the partition member 201. Therefore, the control valve-side oil supply passages 203b and 204b can be easily made to cross each other by transferring the control valve-side oil supply passages 203b and 204b on one surface side and the other surface side of the partition member 201, so that the partition member 201 is required only to be very thin. Accordingly, the first and second control valve-side oil supply passages 203b and 204b can be made to cross each other, without increasing the wall thickness of the clutch cover 58. Consequently, an increase in the size of the internal combustion engine E can be obviated.

Besides, the support holder 200 for holding the first and second oil pressure control valves 194 and 195 is mounted to the clutch cover 58 so as to clamp the partition member 201 between itself and the clutch cover 58. In addition, the surface of the support holder 200 that fronts on the partition member 201 side and the surface of the clutch cover 58 that fronts on the partition member 201 are respectively provided with the grooves 226, 227, and 230 which constitute the first and second control valve-side oil supply passages 203b and 204b in cooperation with the both surfaces of the partition member 201. Therefore, even if the routes of the first and second control valve-side oil supply passages 203b and 204b are complicated, they can be formed simply by machining of grooves. Thus, the first and second control valve-side oil supply passages 203b and 204b can be formed easily.

In addition, the first and second oil pressure control valves 194 and 195 to which the solenoids 233 and 234 are added respectively are disposed under the primary drive gear 77 in side view as viewed in the direction along the axis of the crankshaft 37. Besides, the first and second control valve-side oil supply passages 203b and 204b are so disposed as to cross each other between the primary drive gear 77 and the solenoids 233 and 234 in the side view. Therefore, even if the space between the actuator and the primary drive gear is narrow, the first and second control valve-side oil supply passages 203b and 204b can be passed through the narrow space by causing the oil supply passages to cross each other.

Moreover, the first and second control valve-side oil supply passages 203b and 204b are so disposed as to cross each other outside the range of projection of the first and second oil pressure control valves 194 and 195 to the axial direction of the crankshaft 37. Therefore, though the mutual crossing increases the space for layout of the first and second control valve-side oil supply passages 203b and 204b required in the crossing direction, it is possible to suppress an increase in the engine width in the area where the first and second oil pressure control valves 194 and 195 are disposed.

The clutch oil pressure sensors 235 and 236 are disposed individually at those end portions of the first and second control valve-side oil supply passages 203b, 204b which are on the side opposite to the first and second cover-side oil supply passages 203a and 204a. This ensures that the control oil pressures in the first and second hydraulic clutches 71 and 72 can be detected independently from each other.

The second control valve-side oil supply passage 204b is formed at a part thereof with the semicircular arcuate part 237 disposed along one bolt 202 of the plurality of bolts 202 . . . for fastening the support holder 200 (which clamps the partition member 201 between itself and the clutch cover 58) to the clutch cover 58, in such a manner as to bypass the one bolt 202. This configuration makes it possible to increase the mounting strength at in the area of fastening with the bolt 202, and to restrain the oil from leaking through the vicinity of the bolt 202.

In addition, the level gauge insertion tube 238 extending upward from a lower portion of the clutch cover 58 is disposed on the outside of the clutch cover 58, correspondingly to the area where the first and second control valve-side oil supply passages 203b and 204b cross each other. Thus, the level gauge insertion tube 238 is disposed in the area where the margin as to the engine width is greater than in the area where the first and second oil pressure control valves 194 and 195 are arranged. Consequently, an increase in the size of the engine E can be suppressed.

Besides, the support holder 200 is provided with the containing part 239 for containing the solenoids 233 and 234. In addition, the cable lead-out hole 244 through which to lead out the cables 242 and 243 connected to the solenoids 233 and 234 is provided at an upper portion of the containing part 239 and rearwardly of the first and second control valve-side oil supply passages 203b and 204b. Therefore, the cables 242 and 243 can be led out, without any obstacle on the side of the first and second control valve-side oil supply passages 203b and 204b. This promises enhanced assembleability and maintainability.

Besides, the first and second clutch oil pressure sensors 235 and 236 are disposed on the clutch cover 58 in parallel to and proximate to each other, with their axes oriented in the back-and-forth direction in the condition where the engine body 32 is mounted on the motorcycle. Therefore, the first and second clutch oil pressure sensors 235 and 236 can be disposed efficiently and compactly by aligning their orientations, so that an increase in the size of the internal combustion engine E can be obviated.

Meanwhile, the second oil filter 178 being interposed between the second oil pump 116 and the first and second oil pressure control valves 194 and 195 and having the hollow cylindrical filter case 181 is disposed on the clutch cover 58 so that the axis of the filter case 181 is in a direction crossing the axes of the first and second clutch oil pressure sensors 235 and 236, and that it is positionally deviated from the first and second clutch oil pressure sensors 235 and 236 in the back-and-forth direction in the condition where the engine body 32 is mounted on the motorcycle. Therefore, the second oil filter 178 and the first and second clutch oil pressure sensors 235 and 236 can be disposed with a positional deviation therebetween in the back-and-forth direction so that they do not overlap each other in the left-right direction of the engine body 32. This makes it possible to suppress an increase in the size of the internal combustion engine E in the left-right direction.

In addition, the first and second clutch oil pressure sensors 235 and 236 and the oil filter pressure sensor 191 for detecting the oil pressure supplied to the second oil filter 178 are disposed in parallel to each other. This ensures that the oil filter pressure sensor 191, in addition to the first and second clutch oil pressure sensors 235 and 236, can be disposed efficiently and compactly.

Besides, the outer end of the filter case 181 is disposed on the outer side in relation to the outer end of the oil filter pressure sensor 191 along the axial direction of the filter case 181. This ensures that, when the motorcycle leans down, the oil filter pressure sensor 191 can be protected by the outer end of the filter case 181.

Moreover, the projecting portion 58a projecting to the outer side relative to the first clutch oil pressure sensor 235 (which is the lowest one of the first clutch oil pressure sensor 235, the second clutch oil pressure sensor 236 and the oil filter oil pressure sensor 191) is provided on the clutch cover 58 in such a manner as to be located in the vicinity of the first clutch oil pressure sensor 235. Therefore, when the motorcycle leans down, the first clutch oil pressure sensor 235 which is the lowest one can be protected by the projecting portion 58a.

In addition, the level gauge insertion tube 238 bulging sideways from the clutch cover 58 constituting a part of the engine body 32 is disposed rearwardly of the second oil filter 178. With the level gauge insertion tube 238 thus arranged by utilizing the dead space in the surroundings of the second oil filter 178, an increase in the size of the internal combustion engine E in the left-right direction can be avoided.

The first and second clutch oil pressure sensors 235 and 236 and the oil filter pressure sensor 191 are disposed at a front side lower portion of a side surface of the engine body 32, and the front surface lower portion of the engine body 32 is so curved that a lower portion is located on the more rearward side. Besides, the mounting boss 245 for mounting the first clutch oil pressure sensor 235 (which is the lowest one of the first clutch oil pressure sensor 235, the second clutch oil pressure sensor 236 and the oil filter oil pressure sensor 191) to the engine body 32 is disposed at a position deviated rearward in relation to the mounting bosses 246 and 247 for mounting the remaining hydraulic sensors 236 and 191 to the engine body 32. This makes it possible to obviate a situation in which a part of the first clutch oil pressure sensor 235 projects forward from a lower portion of the engine body 32.

In addition, the first clutch oil pressure sensor 235, the second clutch oil pressure sensor 236 and the oil filter pressure sensor 191 are disposed on the clutch cover 58, which is a side wall of the engine body 32 on an axial-directionally one end side of the crankshaft 37. In this case, the first clutch oil pressure sensor 235, the second clutch oil pressure sensor 236 and the oil filter oil pressure sensor 191 are disposed forwardly of the crankshaft 37 and below the first and second hydraulic clutches 71 and 72. Therefore, the first clutch oil pressure sensor 235, the second clutch oil pressure sensor 236 and the oil filter oil pressure sensor 191 can be arranged in the manner of bypassing the first and second hydraulic clutches 71, 72, which are the largest width of the component parts of the internal combustion engine E, and the crankshaft 37, which influences the width size of the crankcase 38 in the engine body 32. Consequently, an increase in the size of the internal combustion engine E can be suppressed.

Furthermore, the lubricating oil pressure sensor 248 for detecting the supply oil pressure of the lubricating oil supplied to the plurality of to-be-lubricated parts 175 of the engine body 32 is mounted to the engine body 32 forwardly of the clutch oil pressure sensors 235 and 236 and the oil filter pressure sensor 191. Therefore, the first clutch oil pressure sensor 235, the second clutch oil pressure sensor 236 and the oil filter pressure sensor 191, and the lubricating oil pressure sensor 248 can be efficiently laid out while avoiding mutual interference thereof.

While an exemplary embodiment of the present invention has been described above, the invention is not to be restricted to the above embodiment, and various modifications are possible without departure from the invention as defined in the claims.

DESCRIPTION OF REFERENCE SYMBOLS

32 ... Engine body
37 ... Crankshaft
113 ... Oil strainer
114 ... Pump shaft
115 ... First oil pump
116 ... Second oil pump
117 ... Pump casing
118 ... Pump body as first case member
119 ... Pump cover as second case member
120 ... Plate
123 ... Balancer shaft
130, 133 ... Pump chamber
137 ... Balance weight
139 ... Main suction port
140 ... Partition wall
141 ... First suction port
142 ... Second suction port
143 ... First suction passage
144 ... Second suction passage
145, 146 ... Discharge passage
147 ... First relief valve
150, 166 ... Release ports
159 ... Communication hole
163 ... Second relief valve
175 ... To-be-lubricated part
177 ... Oil pressure controller
M ... Transmission

We claim:

1. An internal combustion engine oil supply system contained in a body of the engine, in which a pump casing common to first and second oil pumps having a common pump shaft rotated interlockingly with rotation of a crankshaft of the engine is provided with a main suction port common to said first and second oil pumps, and first and second relief valves are individually connected to discharge passages of said first and second oil pumps, wherein said main suction port is partitioned by a partition wall provided in said pump casing into first and second suction ports, said pump casing is formed with a first suction passage which extends from said first suction port to a suction side of said first oil pump and a second suction passage which is formed independently of said first suction passage so as to extend from said second suction port to a suction side of said second oil pump, and release ports of said first and second relief valves are connected to said second suction passage.

2. The internal combustion engine oil supply system according to claim 1, further including a single oil strainer common to said first and second oil pumps which is disposed at a portion in the engine body lower than the first and second oil pumps, and said first and second suction ports are commonly connected to said oil strainer.

3. The internal combustion engine oil supply system according to claim 2, wherein said first oil pump is connected to supply a lubricating oil to a plurality of to-be-lubricated parts of the engine body, and said second oil pump is connected to supply an oil pressure control oil to an oil pressure controller of a transmission operatively associated with the engine.

4. The internal combustion engine oil supply system according to claim 2, wherein said pump casing includes first and second case members, and a plate interposed between said first and second case members so as to form a pump chamber of said first oil pump between said first case member and the plate and to form a pump chamber of said second oil pump between said second case member and the plate; and said first and second suction passages are isolated from each other by said plate and a partition wall provided integrally with one of said first and second case member.

5. The internal combustion engine oil supply system according to claim 4, wherein said first relief valve is attached to said first case member adjacent to said plate, and said plate is provided with a communication hole through which said release port of said first relief valve communicates with said second suction passage.

6. The internal combustion engine oil supply system according to claim 4, wherein said partition wall partitions said main suction port into upper and lower portions to form said first and second suction ports when said engine body is mounted on a vehicle.

7. The internal combustion engine oil supply system according to claim 2, wherein said pump shaft is coaxially and relatively non-rotatably connected to a balancer shaft, and said main suction port opens toward an inner side of said engine body in a direction along an axis of said balancer shaft so that a joint portion between the main suction port and said oil strainer is located between said pump casing and a balance weight provided on said balancer shaft.

8. The internal combustion engine oil supply system according to claim 1, wherein said first oil pump is connected to supply a lubricating oil to a plurality of to-be-lubricated parts of the engine body, and said second oil pump is connected to supply an oil pressure control oil to an oil pressure controller of a transmission operatively associated with the engine.

9. The internal combustion engine oil supply system according to claim 8, wherein said pump casing includes first and second case members, and a plate interposed between said first and second case members so as to form a pump chamber of said first oil pump between said first case member and the plate and to form a pump chamber of said second oil pump between said second case member and the plate; and said first and second suction passages are isolated from each other by said plate and a partition wall provided integrally with one of said first and second case member.

10. The internal combustion engine oil supply system according to claim 9, wherein said first relief valve is attached to said first case member adjacent to said plate, and said plate is provided with a communication hole through which said release port of said first relief valve communicates with said second suction passage.

11. The internal combustion engine oil supply system according to claim 9, wherein said partition wall partitions said main suction port into upper and lower portions to form said first and second suction ports when said engine body is mounted on a vehicle.

12. The internal combustion engine oil supply system according to claim 9, wherein a width of said partition wall gradually increases along a direction from said plate toward said main suction port.

13. The internal combustion engine oil supply system according to claim 1, wherein said pump casing includes first and second case members, and a plate interposed between said first and second case members so as to form a pump chamber of said first oil pump between said first case member and the plate and to form a pump chamber of said second oil pump between said second case member and the plate; and said first and second suction passages are isolated from each other by said plate and a partition wall provided integrally with one of said first and second case member.

14. The internal combustion engine oil supply system according to claim 13, wherein said first relief valve is attached to said first case member adjacent to said plate, and said plate is provided with a communication hole through which said release port of said first relief valve communicates with said second suction passage.

15. The internal combustion engine oil supply system according to claim 13, wherein said partition wall partitions said main suction port into upper and lower portions to form said first and second suction ports when said engine body is mounted on a vehicle.

16. The internal combustion engine oil supply system according to claim 13, wherein a width of said partition wall gradually increases along a direction from said plate toward said main suction port.

* * * * *